United States Patent
Breakstone et al.

(10) Patent No.: US 10,180,924 B2
(45) Date of Patent: Jan. 15, 2019

(54) PEER-TO-PEER COMMUNICATION FOR GRAPHICS PROCESSING UNITS

(71) Applicant: Liqid Inc., Lafayette, CO (US)

(72) Inventors: Jason Breakstone, Broomfield, CO (US); German Kazakov, Longmont, CO (US); Christopher R. Long, Colorado Springs, CO (US); James Scott Cannata, Denver, CO (US)

(73) Assignee: Liqid Inc., Broomfield, CO (US)

( * ) Notice: Subject to any disclaimer, the term of this patent is extended or adjusted under 35 U.S.C. 154(b) by 0 days.

(21) Appl. No.: 15/848,268

(22) Filed: Dec. 20, 2017

(65) Prior Publication Data

US 2018/0322082 A1 Nov. 8, 2018

Related U.S. Application Data

(60) Provisional application No. 62/592,859, filed on Nov. 30, 2017, provisional application No. 62/502,806, filed on May 8, 2017.

(51) Int. Cl.

| | |
|---|---|
| *G06F 9/50* | (2006.01) |
| *G06F 13/40* | (2006.01) |
| *G06F 13/42* | (2006.01) |
| *G06F 12/02* | (2006.01) |
| *G06T 1/20* | (2006.01) |

(52) U.S. Cl.
CPC ........ *G06F 13/4022* (2013.01); *G06F 9/5044* (2013.01); *G06F 9/5077* (2013.01); *G06F 12/02* (2013.01); *G06F 13/4282* (2013.01); *G06F 2213/0026* (2013.01); *G06T 1/20* (2013.01)

(58) Field of Classification Search
CPC ...... G06F 12/02; G06F 9/5077; G06F 9/5061; G06F 9/5044; G06F 9/5016; G06F 2213/0026; G06F 13/404
See application file for complete search history.

(56) References Cited

U.S. PATENT DOCUMENTS

| | | |
|---|---|---|
| 5,828,207 A | 10/1998 | Saadeh |
| 6,061,750 A | 5/2000 | Beardsley et al. |
| 6,325,636 B1 | 12/2001 | Hipp et al. |
| 7,243,145 B1 | 7/2007 | Poortman |
| 7,260,487 B2 | 8/2007 | Brey et al. |
| 7,505,889 B2 | 3/2009 | Salmonsen et al. |

(Continued)

OTHER PUBLICATIONS

International Application No. PCT/US2018/028790, International Search Report & Written Opinion, 8 pages, dated Jul. 6, 2018.

(Continued)

*Primary Examiner* — Ernest Unelus

(57) ABSTRACT

Disaggregated computing architectures, platforms, and systems are provided herein. In one example, a method of operating a data processing system is provided. The method includes communicatively coupling graphics processing units (GPUs) over a Peripheral Component Interconnect Express (PCIe) fabric. The method also includes establishing a peer-to-peer arrangement between the GPUs over the PCIe fabric by at least providing an isolation function in the PCIe fabric configured to isolate a device PCIe address domain associated with the GPUs from at least a local PCIe address domain associated with a host processor that initiates the peer-to-peer arrangement between the GPUs.

20 Claims, 14 Drawing Sheets

(56) References Cited

U.S. PATENT DOCUMENTS

| | | | |
|---|---|---|---|
| 7,606,960 B2 | 10/2009 | Munguia | |
| 7,725,757 B2 | 5/2010 | Padweka et al. | |
| 7,877,542 B2 | 1/2011 | Chow et al. | |
| 8,045,328 B1 | 10/2011 | Chen | |
| 8,125,919 B1 | 2/2012 | Khanka et al. | |
| 8,150,800 B2 | 4/2012 | Webman et al. | |
| 8,656,117 B1 | 2/2014 | Wong et al. | |
| 8,688,926 B2 | 4/2014 | Breakstone et al. | |
| 8,880,771 B2 | 11/2014 | Subramaniyan et al. | |
| 9,602,437 B1 | 3/2017 | Bernath | |
| 9,804,988 B1 * | 10/2017 | Ayoub | G06F 13/4022 |
| 9,940,123 B1 * | 4/2018 | Ayoub | G06F 8/65 |
| 2002/0059428 A1 | 5/2002 | Susai et al. | |
| 2003/0110423 A1 | 6/2003 | Helms et al. | |
| 2003/0126478 A1 | 7/2003 | Burns et al. | |
| 2005/0223136 A1 | 10/2005 | Tanaka et al. | |
| 2005/0257232 A1 | 11/2005 | Hidaka | |
| 2006/0012950 A1 | 1/2006 | Shih | |
| 2006/0123142 A1 | 6/2006 | Duncan et al. | |
| 2006/0277206 A1 | 12/2006 | Bailey et al. | |
| 2007/0067432 A1 | 3/2007 | Tarui | |
| 2008/0034153 A1 | 2/2008 | Lee et al. | |
| 2008/0198744 A1 | 8/2008 | Menth | |
| 2008/0281938 A1 | 11/2008 | Rai et al. | |
| 2009/0006837 A1 | 1/2009 | Rothman et al. | |
| 2009/0100280 A1 | 4/2009 | Lindsay | |
| 2009/0190427 A1 | 7/2009 | Brittain et al. | |
| 2009/0193201 A1 | 7/2009 | Brittain et al. | |
| 2009/0193203 A1 | 7/2009 | Brittain et al. | |
| 2009/0248941 A1 | 10/2009 | Morein et al. | |
| 2009/0276551 A1 | 11/2009 | Brown et al. | |
| 2010/0088467 A1 | 4/2010 | Lee et al. | |
| 2010/0271766 A1 | 10/2010 | Lin | |
| 2011/0194242 A1 | 8/2011 | Hu et al. | |
| 2011/0289510 A1 | 11/2011 | Lin et al. | |
| 2011/0299317 A1 | 12/2011 | Shaeffer et al. | |
| 2011/0320861 A1 | 12/2011 | Bayer et al. | |
| 2012/0030544 A1 | 2/2012 | Fisher-Jeffes | |
| 2012/0057317 A1 | 3/2012 | Lin | |
| 2012/0089854 A1 | 4/2012 | Breakstone et al. | |
| 2012/0151118 A1 | 6/2012 | Flynn et al. | |
| 2012/0166699 A1 | 6/2012 | Kumar et al. | |
| 2012/0210163 A1 | 8/2012 | Cho | |
| 2012/0317433 A1 | 12/2012 | Ellis et al. | |
| 2013/0077223 A1 | 3/2013 | Xu | |
| 2013/0132643 A1 | 5/2013 | Huang | |
| 2013/0185416 A1 | 7/2013 | Larkin et al. | |
| 2014/0047166 A1 | 2/2014 | Asnaashari et al. | |
| 2014/0056319 A1 | 2/2014 | Hellwig | |
| 2014/0059265 A1 | 2/2014 | Iyer et al. | |
| 2014/0075235 A1 | 3/2014 | Chandhoke et al. | |
| 2014/0103955 A1 | 4/2014 | Avritch et al. | |
| 2014/0108846 A1 | 4/2014 | Berke et al. | |
| 2014/0365714 A1 | 12/2014 | Sweere et al. | |
| 2015/0026385 A1 * | 1/2015 | Egi | H04L 47/785 710/314 |
| 2015/0074322 A1 | 3/2015 | Galles | |
| 2015/0121115 A1 | 4/2015 | Chandra et al. | |
| 2015/0143016 A1 * | 5/2015 | Egi | G06F 13/32 710/313 |
| 2015/0186319 A1 | 7/2015 | Blevins et al. | |
| 2015/0186437 A1 | 7/2015 | Molaro | |
| 2015/0212755 A1 | 7/2015 | Asnaashari | |
| 2015/0304423 A1 | 10/2015 | Satoyama et al. | |
| 2015/0309951 A1 | 10/2015 | Breakstone et al. | |
| 2015/0373115 A1 | 12/2015 | Breakstone et al. | |
| 2015/0382499 A1 | 12/2015 | Chiasson et al. | |
| 2016/0073544 A1 | 3/2016 | Heyd et al. | |
| 2016/0077976 A1 | 3/2016 | Raikin et al. | |
| 2016/0197996 A1 | 7/2016 | Barton et al. | |
| 2016/0248631 A1 | 8/2016 | Duchesneau | |
| 2017/0147456 A1 * | 5/2017 | Lee | G06F 11/2033 |

OTHER PUBLICATIONS

International Application No. PCT/US2018/028791, International Search Report & Written Opinion, 9 pages, dated Jul. 6, 2018.
Aragon, Juan L. et al., "Control Speculation for Energy-Efficient Next-Generation Superscalar Processors," IEEE Transactions on Computers, vol. 55, No. 3, pp. 281-291, Mar. 2006.
International Application No. PCT/US2017/046602, International Search Report & Written Opinion, 8 pages, dated Oct. 19, 2017.
International Application No. PCT/US2017/046607, International Search Report & Written Opinion, 7 pages, dated Oct. 23, 2017.
Lu, Yingping et al., "Performance Study of iSCSI-Based Storage Subsystems," IEEE Communications Magazine, pp. 76-82, Aug. 2003.

* cited by examiner

PEER-TO-PEER COMMUNICATION FOR GRAPHICS PROCESSING UNITS

RELATED APPLICATIONS

This application hereby claims the benefit of and priority to U.S. Provisional Patent Application No. 62/502,806, titled "FABRIC-SWITCHED GRAPHICS PROCESSING UNIT (GPU) ENCLOSURES," filed May 8, 2017, and U.S. Provisional Patent Application No. 62/592,859, titled "PEER-TO-PEER COMMUNICATION FOR GRAPHICS PROCESSING UNITS," filed Nov. 30, 2017, which are hereby incorporated by reference in their entirety.

BACKGROUND

Computer systems typically include data storage systems as well as various processing systems, which might include central processing units (CPUs) as well as graphics processing units (GPUs). As data processing and data storage needs have increased in these computer systems, networked storage systems have been introduced which handle large amounts of data in a computing environment physically separate from end user computer devices. These networked storage systems typically provide access to bulk data storage and data processing over one or more network interfaces to end users or other external systems. These networked storage systems and remote computing systems can be included in high-density installations, such as rack-mounted environments.

However, as the densities of networked storage systems and remote computing systems increase, various physical limitations can be reached. These limitations include density limitations based on the underlying storage technology, such as in the example of large arrays of rotating magnetic media storage systems. These limitations can also include computing or data processing density limitations based on the various physical space requirements for data processing equipment and network interconnect, as well as the large space requirements for environmental climate control systems. In addition to physical space limitations, these data systems have been traditionally limited in the number of devices that can be included per host, which can be problematic in environments where higher capacity, redundancy, and reliability is desired. These shortcomings can be especially pronounced with the increasing data storage and processing needs in networked, cloud, and enterprise environments.

OVERVIEW

Disaggregated computing architectures, platforms, and systems are provided herein. In one example, a method of operating a data processing system is provided. The method includes communicatively coupling graphics processing units (GPUs) over a Peripheral Component Interconnect Express (PCIe) fabric. The method also includes establishing a peer-to-peer arrangement between the GPUs over the PCIe fabric by at least providing an isolation function in the PCIe fabric configured to isolate a device PCIe address domain associated with the GPUs from at least a local PCIe address domain associated with a host processor that initiates the peer-to-peer arrangement between the GPUs.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
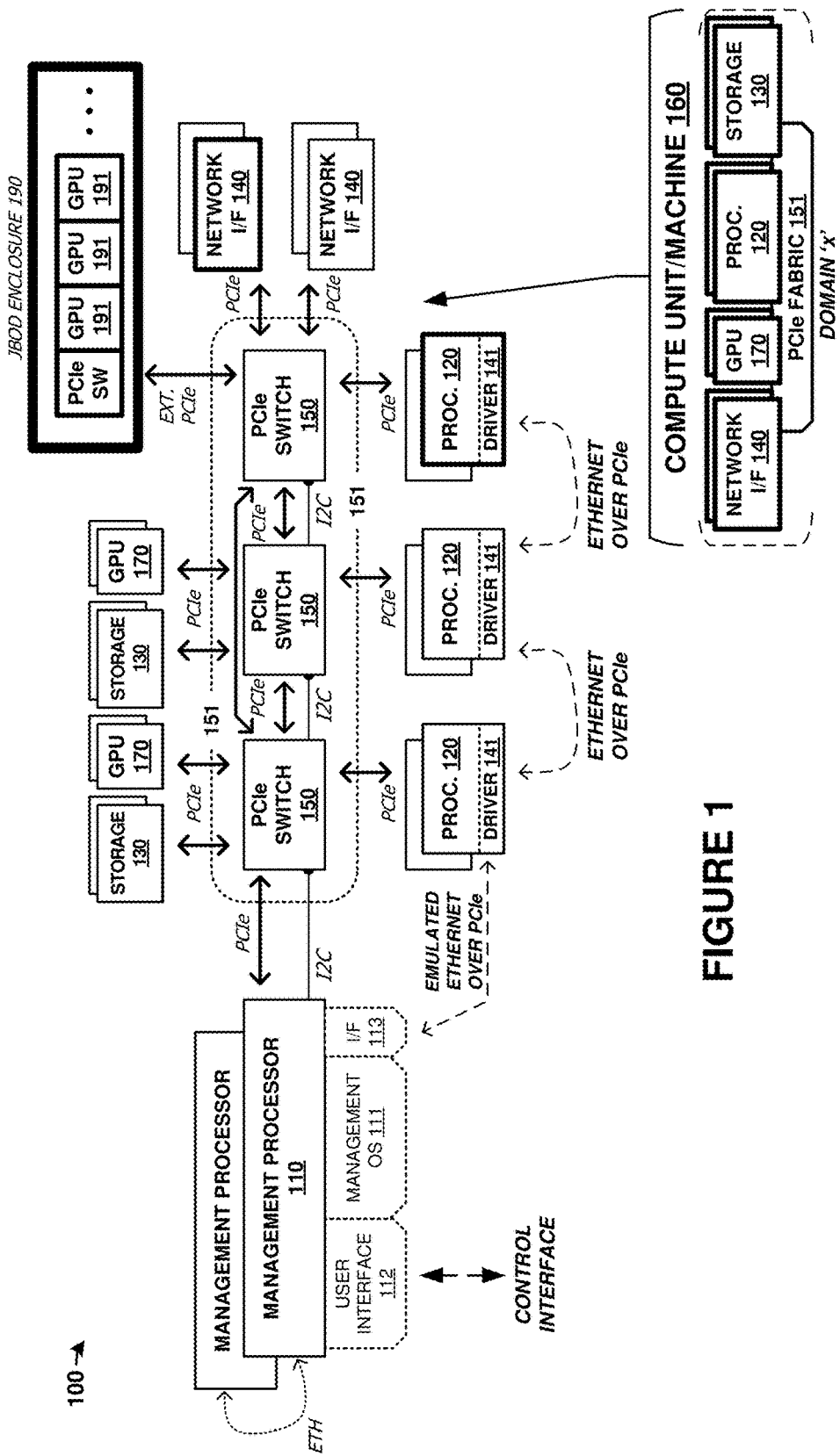
FIG. 1 illustrates a computing platform in an implementation.

FIG. 1 is a system diagram illustrating computing platform 100. Computing platform 100 includes one or more management processors, 110, and a plurality of physical computing components. The physical computing components include processors 120, storage elements 130, network elements 140, Peripheral Component Interconnect Express (PCIe) switch elements 150, and graphics processing units (GPUs) 170. These physical computing components are communicatively coupled over PCIe fabric 151 formed from PCIe switch elements 150 and various corresponding PCIe links. PCIe fabric 151 configured to communicatively couple a plurality of plurality of physical computing components and establish compute blocks using logical partitioning within the PCIe fabric. These compute blocks, referred to in FIG. 1 as machine(s) 160, can each be comprised of any number of processors 120, storage units 130, network interfaces 140 modules, and GPUs 170, including zero of any module.

The components of platform 100 can be included in one or more physical enclosures, such as rack-mountable units which can further be included in shelving or rack units. A predetermined number of components of platform 100 can be inserted or installed into a physical enclosure, such as a modular framework where modules can be inserted and removed according to the needs of a particular end user. An enclosed modular system, such as platform 100, can include physical support structure and enclosure that includes circuitry, printed circuit boards, semiconductor systems, and structural elements. The modules that comprise the components of platform 100 are insertable and removable from a rackmount style of enclosure. In some examples, the elements of FIG. 1 are included in a chassis (e.g. 1U, 2U, or 3U) for mounting in a larger rackmount environment. It should be understood that the elements of FIG. 1 can be included in any physical mounting environment, and need not include any associated enclosures or rackmount elements.

In addition to the components described above, an external enclosure can be employed that comprises a plurality of graphics modules, graphics cards, or other graphics processing elements that comprise GPU portions. In FIG. 1, a just a box of disks (JBOD) enclosure is shown that includes a PCIe switch circuit that couples any number of included devices, such as GPUs 191, over one or more PCIe links to another enclosure comprising the computing, storage, and network elements discussed above. The enclosure might not comprise a JBOD enclosure, but typically comprises a modular assembly where individual graphics modules can be inserted and removed into associated slots or bays. In JBOD examples, disk drives or storage devices are typically inserted to create a storage system. However, in the examples herein, graphics modules are inserted instead of storage drives or storage modules, which advantageously provides for coupling of a large number of GPUs to handle data/graphics processing within a similar physical enclosure space. In one example, the JBOD enclosure might include 24 slots for storage/drive modules that are instead populated with one or more GPUs carried on graphics modules. The external PCIe link that couples enclosures can comprise any of the external PCIe link physical and logical examples discussed herein.

Once the components of platform 100 have been inserted into the enclosure or enclosures, the components can be coupled over the PCIe fabric and logically isolated into any number of separate "machines" or compute blocks. The PCIe fabric can be configured by management processor 110 to selectively route traffic among the components of a particular compute module and with external systems, while maintaining logical isolation between components not included in a particular compute module. In this way, a flexible "bare metal" configuration can be established among the components of platform 100. The individual compute blocks can be associated with external users or client machines that can utilize the computing, storage, network, or graphics processing resources of the compute block. Moreover, any number of compute blocks can be grouped into a "cluster" of compute blocks for greater parallelism and capacity. Although not shown in FIG. 1 for clarity, various power supply modules and associated power and control distribution links can also be included.

Turning now to the components of platform 100, management processor 110 can comprise one or more microprocessors and other processing circuitry that retrieves and executes software, such as user interface 112 and management operating system 111, from an associated storage system. Processor 110 can be implemented within a single processing device but can also be distributed across multiple processing devices or sub-systems that cooperate in executing program instructions. Examples of processor 110 include general purpose central processing units, application specific processors, and logic devices, as well as any other type of processing device, combinations, or variations thereof. In some examples, processor 110 comprises an Intel or AMD microprocessor, ARM microprocessor, FPGA, ASIC, application specific processor, or other microprocessor or processing elements.

In FIG. 1, processor 110 provides interface 113. Interface 113 comprises a communication link between processor 110 and any component coupled to PCIe fabric 151. This interface employs Ethernet traffic transported over a PCIe link. Additionally, each processor 120 in FIG. 1 is configured with driver 141 which provides for Ethernet communication over PCIe links. Thus, any of processor 120 and processor 110 can communicate over Ethernet that is transported over the PCIe fabric. A further discussion of this Ethernet over PCIe configuration is discussed below.

A plurality of processors 120 are included in platform 100. Each processor 120 includes one or more microprocessors and other processing circuitry that retrieves and executes software, such as driver 141 and any number of end user applications, from an associated storage system. Each processor 120 can be implemented within a single processing device but can also be distributed across multiple processing devices or sub-systems that cooperate in executing program instructions. Examples of each processor 120 include general purpose central processing units, application specific processors, and logic devices, as well as any other type of processing device, combinations, or variations thereof. In some examples, each processor 120 comprises an Intel or AMD microprocessor, ARM microprocessor, graphics processor, compute cores, graphics cores, application specific integrated circuit (ASIC), or other microprocessor or processing elements. Each processor 120 can also communicate with other compute units, such as those in a same storage assembly/enclosure or another storage assembly/enclosure over one or more PCIe interfaces and PCIe fabric 151.

A plurality of storage units 130 are included in platform 100. Each storage unit 130 includes one or more storage drives, such as solid state drives in some examples. Each storage unit 130 also includes PCIe interfaces, control processors, and power system elements. Each storage unit 130 also includes an on-sled processor or control system for traffic statistics and status monitoring, among other operations. Each storage unit 130 comprises one or more solid state memory devices with a PCIe interface. In yet other examples, each storage unit 130 comprises one or more separate solid state drives (SSDs) or magnetic hard disk drives (HDDs) along with associated enclosures and circuitry.

A plurality of graphics processing units (GPUs) 170 are included in platform 100. Each GPU comprises a graphics processing resource that can be allocated to one or more compute units. The GPUs can comprise graphics processors, shaders, pixel render elements, frame buffers, texture mappers, graphics cores, graphics pipelines, graphics memory, or other graphics processing and handling elements. In some examples, each GPU 170 comprises a graphics 'card' comprising circuitry that supports a GPU chip. Example GPU cards include nVidia Jetson or Tesla cards that include graphics processing elements and compute elements, along with various support circuitry, connectors, and other elements. Some example GPU modules also include CPUs or other processors to aid in the function of the GPU elements, as well as PCIe interfaces and related circuitry. GPU elements 191 can also comprise elements discussed above for GPUs 170, and further comprise physical modules or carriers that are insertable into slots of bays of the associated JBOD or other enclosure.

Network interfaces 140 include network interface cards for communicating over TCP/IP (Transmission Control Protocol (TCP)/Internet Protocol) networks or for carrying user traffic, such as iSCSI (Internet Small Computer System Interface) or NVMe (NVM Express) traffic for storage units 130 or other TCP/IP traffic for processors 120. Network interfaces 140 can comprise Ethernet interface equipment, and can communicate over wired, optical, or wireless links. External access to components of platform 100 is provided over packet network links provided by network interfaces 140. Network interfaces 140 communicate with other components of platform 100, such as processors 120 and storage units 130 over associated PCIe links and PCIe fabric 151. In some examples, network interfaces are provided for intra-system network communication among for communicating over Ethernet networks for exchanging communications between any of processors 120 and processors 110.

Each PCIe switch 150 communicates over associated PCIe links. In the example in FIG. 1, PCIe switches 150 can be used for carrying user data between network interfaces 140, storage units 130, and processing units 120. Each PCIe switch 150 comprises a PCIe cross connect switch for establishing switched connections between any PCIe interfaces handled by each PCIe switch 150. In some examples, ones of PCIe switches 150 comprise PLX/Broadcom/Avago PEX8796 24-port, 96 lane PCIe switch chips, PEX8725 10-port, 24 lane PCIe switch chips, PEX97xx chips, PEX9797 chips, or other PEX87xx/PEX97xx chips.

The PCIe switches discussed herein can comprise PCIe crosspoint switches, which logically interconnect various ones of the associated PCIe links based at least on the traffic carried by each PCIe link. In these examples, a domain-based PCIe signaling distribution can be included which allows segregation of PCIe ports of a PCIe switch according to user-defined groups. The user-defined groups can be managed by processor 110 which logically integrate components into associated compute units 160 of a particular cluster and logically isolate components and compute units among different clusters. In addition to, or alternatively from the domain-based segregation, each PCIe switch port can be a non-transparent (NT) or transparent port. An NT port can allow some logical isolation between endpoints, much like a bridge, while a transparent port does not allow logical isolation, and has the effect of connecting endpoints in a purely switched configuration. Access over an NT port or ports can include additional handshaking between the PCIe switch and the initiating endpoint to select a particular NT port or to allow visibility through the NT port.

PCIe can support multiple bus widths, such as ×1, ×4, ×8, ×16, and ×32, with each multiple of bus width comprising an additional "lane" for data transfer. PCIe also supports transfer of sideband signaling, such as System Management Bus (SMBus) interfaces and Joint Test Action Group (JTAG) interfaces, as well as associated clocks, power, and boot-strapping, among other signaling. Although PCIe is used in FIG. 1, it should be understood that different communication links or busses can instead be employed, such as NVMe, Ethernet, Serial Attached SCSI (SAS), FibreChannel, Thunderbolt, Serial Attached ATA Express (SATA Express), among other high-speed serial near-range interfaces, various networks, and link interfaces. Any of the links in FIG. 1 can each use various communication media, such as air, space, metal, optical fiber, or some other signal propagation path, including combinations thereof. Any of the links in FIG. 1 can include any number of PCIe links or lane configurations. Any of the links in FIG. 1 can each be a direct link or might include various equipment, intermediate components, systems, and networks. Any of the links in FIG. 1 can each be a common link, shared link, aggregated link, or may be comprised of discrete, separate links.

In FIG. 1, any compute module 120 has configurable logical visibility to any/all storage units 130 or GPU 170/191, as segregated logically by the PCIe fabric. Any compute module 120 can transfer data for storage on any storage unit 130 and retrieve data stored on any storage unit 130. Thus, 'm' number of storage drives can be coupled with 'n' number of processors to allow for a large, scalable architecture with a high-level of redundancy and density. Furthermore, any compute module 120 can transfer data for processing by any GPU 170/191 or hand off control of any GPU to another compute module 120.

To provide visibility of each compute module 120 to any storage unit 130 or GPU 170/191, various techniques can be employed. In a first example, management processor 110 establishes a cluster that includes one or more compute units 160. These compute units comprise one or more processor 120 elements, zero or more storage units 130, zero or more network interface units 140, and zero or more graphics processing units 170/191. Elements of these compute units are communicatively coupled by portions of PCIe fabric 151 and any associated external PCIe interfaces to external enclosures, such as JBOD 190. Once compute units 160 have been assigned to a particular cluster, further resources can be assigned to that cluster, such as storage resources, graphics processing resources, and network interface resources, among other resources. Management processor 110 can instantiate/bind a subset number of the total quantity of storage resources of platform 100 to a particular cluster and for use by one or more compute units 160 of that cluster. For example, 16 storage drives spanning 4 storage units might be assigned to a group of two compute units 160 in a cluster. The compute units 160 assigned to a cluster then handle transactions for that subset of storage units, such as read and write transactions.

Each compute unit 160, specifically a processor of the compute unit, can have memory-mapped or routing-table based visibility to the storage units or graphics units within that cluster, while other units not associated with a cluster are generally not accessible to the compute units until logical visibility is granted. Moreover, each compute unit might only manage a subset of the storage or graphics units for an associated cluster. Storage operations or graphics processing operations might, however, be received over a network interface associated with a first compute unit that are managed by a second compute unit. When a storage operation or graphics processing operation is desired for a resource unit not managed by a first compute unit (i.e. managed by the second compute unit), the first compute unit uses the memory mapped access or routing-table based visibility to direct the operation to the proper resource unit for that transaction, by way of the second compute unit. The transaction can be transferred and transitioned to the appropriate compute unit that manages that resource unit associated with the data of the transaction. For storage operations, the PCIe fabric is used to transfer data between compute units/processors of a cluster so that a particular compute unit/processor can store the data in the storage unit or storage drive that is managed by that particular compute unit/processor, even though the data might be received over a network interface associated with a different compute unit/processor. For graphics processing operations, the PCIe fabric is used to transfer graphics data and graphics processing commands between compute units/processors of a cluster so that a particular compute unit/processor can control the GPU or GPUs that are managed by that particular compute unit/processor, even though the data might be received over a network interface associated with a different compute unit/processor. Thus, while each particular compute unit of a cluster actually manages a subset of the total resource units (such as storage drives in storage units or graphics processors in graphics units), all compute units of a cluster have visibility to, and can initiate transactions to, any of resource units of the cluster. A managing compute unit that manages a particular resource unit can receive re-transferred transactions and any associated data from an initiating compute unit by at least using a memory-mapped address space or routing table to establish which processing module handles storage operations for a particular set of storage units.

In graphics processing examples, NT partitioning or domain-based partitioning in the switched PCIe fabric can be provided by one or more of the PCIe switches with NT ports or domain-based features. This partitioning can ensure that GPUs can be interworked with a desired compute unit and that more than one GPU, such as more than eight (8) GPUs can be associated with a particular compute unit. Moreover, dynamic GPU-compute unit relationships can be adjusted on-the-fly using partitioning across the PCIe fabric. Shared network resources can also be applied across compute units for graphics processing elements. For example, when a first compute processor determines that the first compute processor does not physically manage the graphics unit associated with a received graphics operation, then the first compute processor transfers the graphics operation over the PCIe fabric to another compute processor of the cluster that does manage the graphics unit.

In further examples, memory mapped direct memory access (DMA) conduits can be formed between individual CPU/GPU pairs. This memory mapping can occur over the PCIe fabric address space, among other configurations. To provide these DMA conduits over a shared PCIe fabric comprising many CPUs and GPUs, the logical partitioning described herein can be employed. Specifically, NT ports or domain-based partitioning on PCIe switches can isolate individual DMA conduits among the associated CPUs/GPUs.

In storage operations, such as a write operation, data can be received over network interfaces 140 of a particular cluster by a particular processor of that cluster. Load balancing or other factors can allow any network interface of that cluster to receive storage operations for any of the processors of that cluster and for any of the storage units of that cluster. For example, the write operation can be a write operation received over a first network interface 140 of a first cluster from an end user employing an iSCSI protocol or NVMe protocol. A first processor of the cluster can receive the write operation and determine if the first processor manages the storage drive or drives associated with the write operation, and if the first processor does, then the first processor transfers the data for storage on the associated storage drives of a storage unit over the PCIe fabric. The individual PCIe switches 150 of the PCIe fabric can be configured to route PCIe traffic associated with the cluster among the various storage, processor, and network elements of the cluster, such as using domain-based routing or NT ports. If the first processor determines that the first processor does not physically manage the storage drive or drives associated with the write operation, then the first processor transfers the write operation to another processor of the cluster that does manage the storage drive or drives over the PCIe fabric. Data striping can be employed by any processor to stripe data for a particular write transaction over any number of storage drives or storage units, such as over one or more of the storage units of the cluster.

In this example, PCIe fabric 151 associated with platform 100 has 64-bit address spaces, which allows an addressable space of $2^{64}$ bytes, leading to at least 16 exbibytes of byte-addressable memory. The 64-bit PCIe address space can shared by all compute units or segregated among various compute units forming clusters for appropriate memory mapping to resource units. The individual PCIe switches 150 of the PCIe fabric can be configured to segregate and route PCIe traffic associated with particular clusters among the various storage, compute, graphics processing, and network elements of the cluster. This segregation and routing can be establishing using domain-based routing or NT ports to establish cross-point connections among the various PCIe switches of the PCIe fabric. Redundancy and failover pathways can also be established so that traffic of the cluster can still be routed among the elements of the cluster when one or more of the PCIe switches fails or becomes unresponsive. In some examples, a mesh configuration is formed by the PCIe switches of the PCIe fabric to ensure redundant routing of PCIe traffic.

Management processor 110 controls the operations of PCIe switches 150 and PCIe fabric 151 over one or more interfaces, which can include inter-integrated circuit (I2C) interfaces that communicatively couple each PCIe switch of the PCIe fabric. Management processor 110 can establish NT-based or domain-based segregation among a PCIe address space using PCIe switches 150. Each PCIe switch can be configured to segregate portions of the PCIe address space to establish cluster-specific partitioning. Various configuration settings of each PCIe switch can be altered by management processor 110 to establish the domains and cluster segregation. In some examples, management processor 110 can include a PCIe interface and communicate/configure the PCIe switches over the PCIe interface or sideband interfaces transported within the PCIe protocol signaling.

Management operating system (OS) 111 is executed by management processor 110 and provides for management of resources of platform 100. The management includes creation, alteration, and monitoring of one or more clusters comprising one or more compute units. Management OS 111 provides for the functionality and operations described herein for management processor 110. Management processor 110 also includes user interface 112, which can present a graphical user interface (GUI) to one or more users. User interface 112 and the GUI can be employed by end users or administrators to establish clusters, assign assets (compute units/machines) to each cluster. User interface 112 can provide other user interfaces than a GUI, such as command line interfaces, application programming interfaces (APIs), or other interfaces. In some examples, a GUI is provided over a websockets-based interface.

More than one more than one management processor can be included in a system, such as when each management processor can manage resources for a predetermined number of clusters or compute units. User commands, such as those received over a GUI, can be received into any of the management processors of a system and forwarded by the receiving management processor to the handling management processor. Each management processor can have a unique or pre-assigned identifier which can aid in delivery of user commands to the proper management processor. Additionally, management processors can communicate with each other, such as using a mailbox process or other data exchange technique. This communication can occur over dedicated sideband interfaces, such as I2C interfaces, or can occur over PCIe or Ethernet interfaces that couple each management processor.

Management OS 111 also includes emulated network interface 113. Emulated network interface 113 comprises a transport mechanism for transporting network traffic over one or more PCIe interfaces. Emulated network interface 113 can emulate a network device, such as an Ethernet device, to management processor 110 so that management processor 110 can interact/interface with any of processors 120 over a PCIe interface as if the processor was communicating over a network interface. Emulated network interface 113 can comprise a kernel-level element or module which allows management OS 111 to interface using Ethernet-style commands and drivers. Emulated network interface 113 allows applications or OS-level processes to communicate with the emulated network device without having associated latency and processing overhead associated with a network stack. Emulated network interface 113 comprises a driver or module, such as a kernel-level module, that appears as a network device to the application-level and system-level software executed by the processor device, but does not require network stack processing. Instead, emulated network interface 113 transfers associated traffic over a PCIe interface or PCIe fabric to another emulated network device. Advantageously, emulated network interface 113 does not employ network stack processing but still appears as network device, so that software of the associated processor can interact without modification with the emulated network device.

Emulated network interface 113 translates PCIe traffic into network device traffic and vice versa. Processing communications transferred to the network device over a network stack is omitted, where the network stack would typically be employed for the type of network device/interface presented. For example, the network device might be presented as an Ethernet device to the operating system or applications. Communications received from the operating system or applications are to be transferred by the network device to one or more destinations. However, emulated network interface 113 does not include a network stack to process the communications down from an application layer down to a link layer. Instead, emulated network interface 113 extracts the payload data and destination from the communications received from the operating system or applications and translates the payload data and destination into PCIe traffic, such as by encapsulating the payload data into PCIe frames using addressing associated with the destination.

Management driver 141 is included on each processor 120. Management driver 141 can include emulated network interfaces, such as discussed for emulated network interface 113. Additionally, management driver 141 monitors operation of the associated processor 120 and software executed by processor 120 and provides telemetry for this operation to management processor 110. Thus, any user provided software can be executed by each processor 120, such as user-provided operating systems (Windows, Linux, MacOS, Android, iOS, etc. . . . ) or user application software and drivers. Management driver 141 provides functionality to allow each processor 120 to participate in the associated compute unit and/or cluster, as well as provide telemetry data to an associated management processor. Each processor 120 can also communicate with each other over an emulated network device that transports the network traffic over the PCIe fabric. Driver 141 also provides an API for user software and operating systems to interact with driver 141 as well as exchange control/telemetry signaling with management processor 110.

Figure 2:
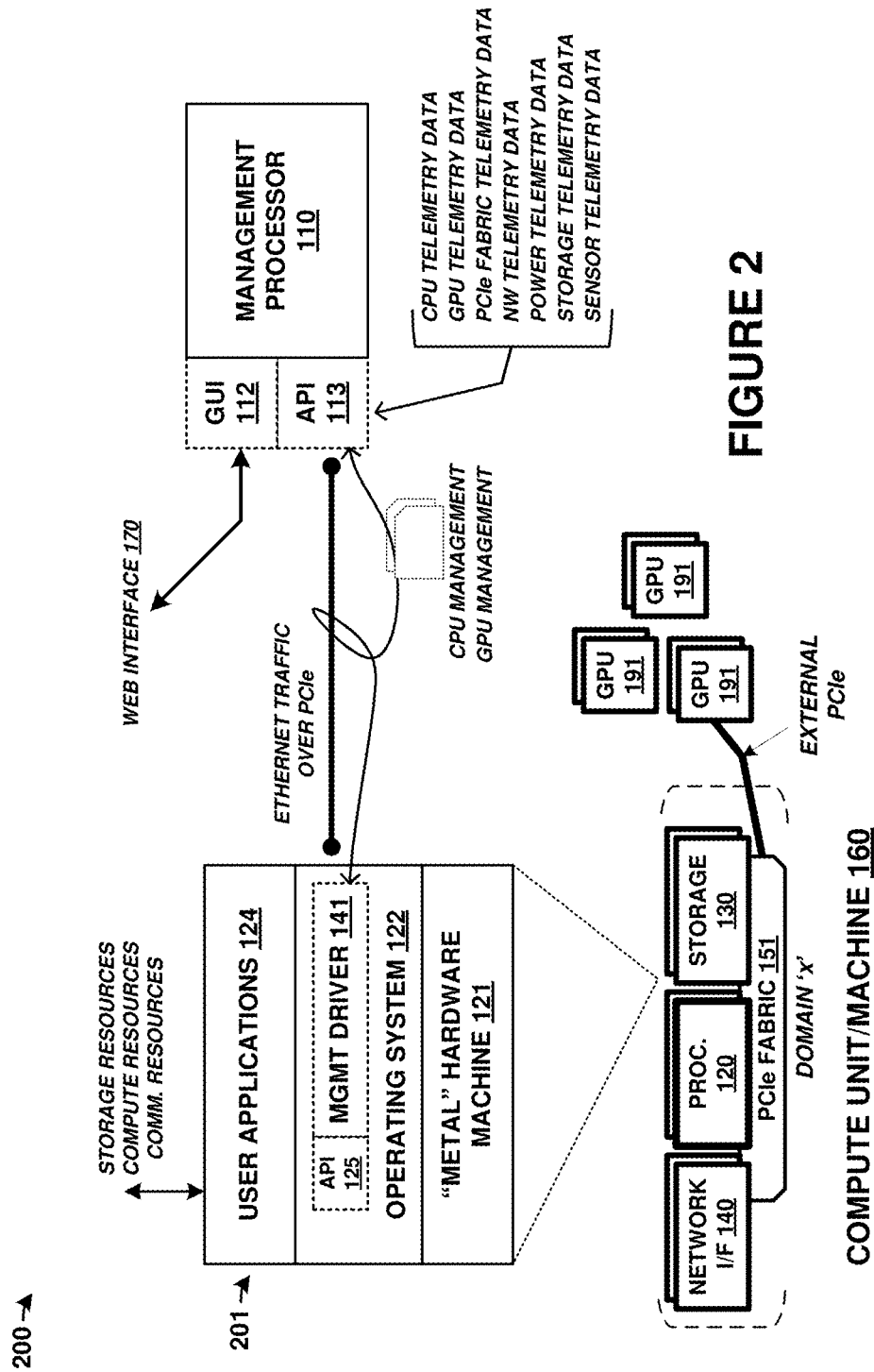
FIG. 2 illustrates management of a computing platform in an implementation.

FIG. 2 is a system diagram that includes further details on elements from FIG. 1. System 200 includes a detailed view of an implementation of processor 120 as well as management processor 110.

In FIG. 2, processor 120 can be an exemplary processor in any compute unit or machine of a cluster. Detailed view 201 shows several layers of processor 120. A first layer 121 is the hardware layer or "metal" machine infrastructure of processor 120. A second layer 122 provides the OS as well as management driver 141 and API 125. Finally, a third layer 124 provides user-level applications. View 201 shows that user applications can access storage, compute, graphics processing, and communication resources of the cluster, such as when the user application comprises a clustered storage system or a clustered processing system.

As discussed above, driver 141 provides an emulated network device for communicating over a PCIe fabric with management processor 110 (or other processor 120 elements). This is shown in FIG. 2 as Ethernet traffic transported over PCIe. However, a network stack is not employed in driver 141 to transport the traffic over PCIe. Instead, driver 141 appears as a network device to an operating system or kernel to each processor 120. User-level services/applications/software can interact with the emulated network device without modifications from a normal or physical network device. However, the traffic associated with the emulated network device is transported over a PCIe link or PCIe fabric, as shown. API 113 can provide a standardized interface for the management traffic, such as for control instructions, control responses, telemetry data, status information, or other data.

Figure 3:
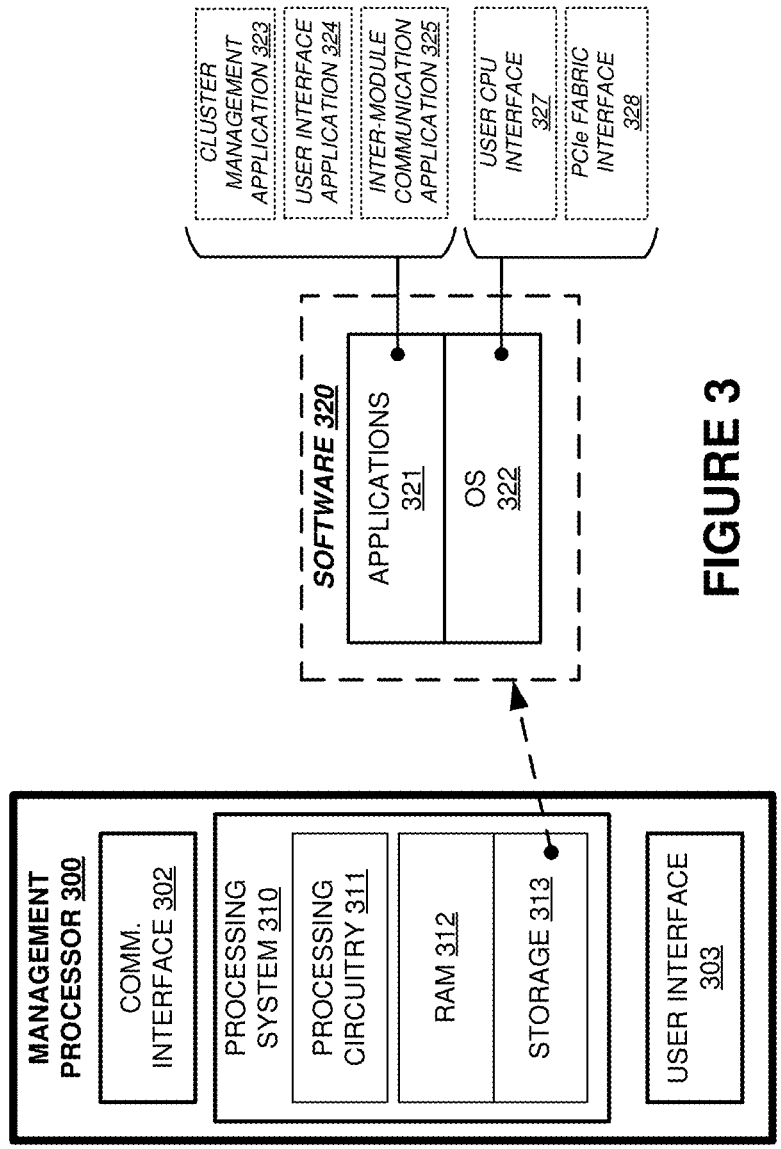
FIG. 3 illustrates a management processor in an implementation.

FIG. 3 is s block diagram illustrating management processor 300. Management processor 300 illustrates an example of any of the management processors discussed herein, such as processor 110 of FIG. 1. Management processor 300 includes communication interface 302, user interface 303, and processing system 310. Processing system 310 includes processing circuitry 311, random access memory (RAM) 312, and storage 313, although further elements can be included.

Processing circuitry 311 can be implemented within a single processing device but can also be distributed across multiple processing devices or sub-systems that cooperate in executing program instructions. Examples of processing circuitry 311 include general purpose central processing units, microprocessors, application specific processors, and logic devices, as well as any other type of processing device. In some examples, processing circuitry 311 includes physically distributed processing devices, such as cloud computing systems.

Communication interface 302 includes one or more communication and network interfaces for communicating over communication links, networks, such as packet networks, the Internet, and the like. The communication interfaces can include PCIe interfaces, Ethernet interfaces, serial interfaces, serial peripheral interface (SPI) links, inter-integrated circuit (I2C) interfaces, universal serial bus (USB) interfaces, UART interfaces, wireless interfaces, or one or more local or wide area network communication interfaces which can communicate over Ethernet or Internet protocol (IP) links. Communication interface 302 can include network interfaces configured to communicate using one or more network addresses, which can be associated with different network links. Examples of communication interface 302 include network interface card equipment, transceivers, modems, and other communication circuitry.

User interface 303 may include a touchscreen, keyboard, mouse, voice input device, audio input device, or other touch input device for receiving input from a user. Output devices such as a display, speakers, web interfaces, terminal interfaces, and other types of output devices may also be included in user interface 303. User interface 303 can provide output and receive input over a network interface, such as communication interface 302. In network examples, user interface 303 might packetize display or graphics data for remote display by a display system or computing system coupled over one or more network interfaces. Physical or logical elements of user interface 303 can provide alerts or visual outputs to users or other operators. User interface 303 may also include associated user interface software executable by processing system 310 in support of the various user input and output devices discussed above. Separately or in conjunction with each other and other hardware and software elements, the user interface software and user interface devices may support a graphical user interface, a natural user interface, or any other type of user interface.

RAM 312 and storage 313 together can comprise a non-transitory data storage system, although variations are possible. RAM 312 and storage 313 can each comprise any storage media readable by processing circuitry 311 and capable of storing software. RAM 312 can include volatile and nonvolatile, removable and non-removable media implemented in any method or technology for storage of information, such as computer readable instructions, data structures, program modules, or other data. Storage 313 can include non-volatile storage media, such as solid state storage media, flash memory, phase change memory, or magnetic memory, including combinations thereof. RAM 312 and storage 313 can each be implemented as a single storage device but can also be implemented across multiple storage devices or sub-systems. RAM 312 and storage 313 can each comprise additional elements, such as controllers, capable of communicating with processing circuitry 311.

Software stored on or in RAM 312 or storage 313 can comprise computer program instructions, firmware, or some other form of machine-readable processing instructions having processes that when executed a processing system direct processor 300 to operate as described herein. For example, software 320 can drive processor 300 to receive user commands to establish clusters comprising compute blocks among a plurality of physical computing components that include compute modules, storage modules, and network modules. Software 320 can drive processor 300 to receive and monitor telemetry data, statistical information, operational data, and other data to provide telemetry to users and alter operation of clusters according to the telemetry data or other data. Software 320 can drive processor 300 to manage cluster and compute/graphics unit resources, establish domain partitioning or NT partitioning among PCIe fabric elements, and interface with individual PCIe switches, among other operations. The software can also include user software applications, application programming interfaces (APIs), or user interfaces. The software can be implemented as a single application or as multiple applications. In general, the software can, when loaded into a processing system and executed, transform the processing system from a general-purpose device into a special-purpose device customized as described herein.

System software 320 illustrates a detailed view of an example configuration of RAM 312. It should be understood that different configurations are possible. System software 320 includes applications 321 and operating system (OS) 322. Software applications 323-326 each comprise executable instructions which can be executed by processor 300 for operating a cluster controller or other circuitry according to the operations discussed herein.

Specifically, cluster management application 323 establishes and maintains clusters and compute units among various hardware elements of a computing platform, such as seen in FIG. 1. Cluster management application 323 can also provision/deprovision PCIe devices from communication or logical connection over an associated PCIe fabric, establish isolation functions to allow dynamic allocation of PCIe devices, such as GPUs, from one or more host processors. User interface application 324 provides one or more graphical or other user interfaces for end users to administer associated clusters and compute units and monitor operations of the clusters and compute units. Inter-module communication application 325 provides communication among other processor 300 elements, such as over I2C, Ethernet, emulated network devices, or PCIe interfaces. User CPU interface 327 provides communication, APIs, and emulated network devices for communicating with processors of compute units, and specialized driver elements thereof. PCIe fabric interface 328 establishes various logical partitioning or domains among PCIe switch elements, controls operation of PCIe switch elements, and receives telemetry from PCIe switch elements.

Software 320 can reside in RAM 312 during execution and operation of processor 300, and can reside in storage system 313 during a powered-off state, among other locations and states. Software 320 can be loaded into RAM 312 during a startup or boot procedure as described for computer operating systems and applications. Software 320 can receive user input through user interface 303. This user input can include user commands, as well as other input, including combinations thereof.

Storage system 313 can comprise flash memory such as NAND flash or NOR flash memory, phase change memory, resistive memory, magnetic memory, among other solid state storage technologies. As shown in FIG. 3, storage system 313 includes software 320. As described above, software 320 can be in a non-volatile storage space for applications and OS during a powered-down state of processor 300, among other operating software.

Processor 300 is generally intended to represent a computing system with which at least software 320 is deployed and executed in order to render or otherwise implement the operations described herein. However, processor 300 can also represent any computing system on which at least software 320 can be staged and from where software 320 can be distributed, transported, downloaded, or otherwise provided to yet another computing system for deployment and execution, or yet additional distribution.

Figure 4:
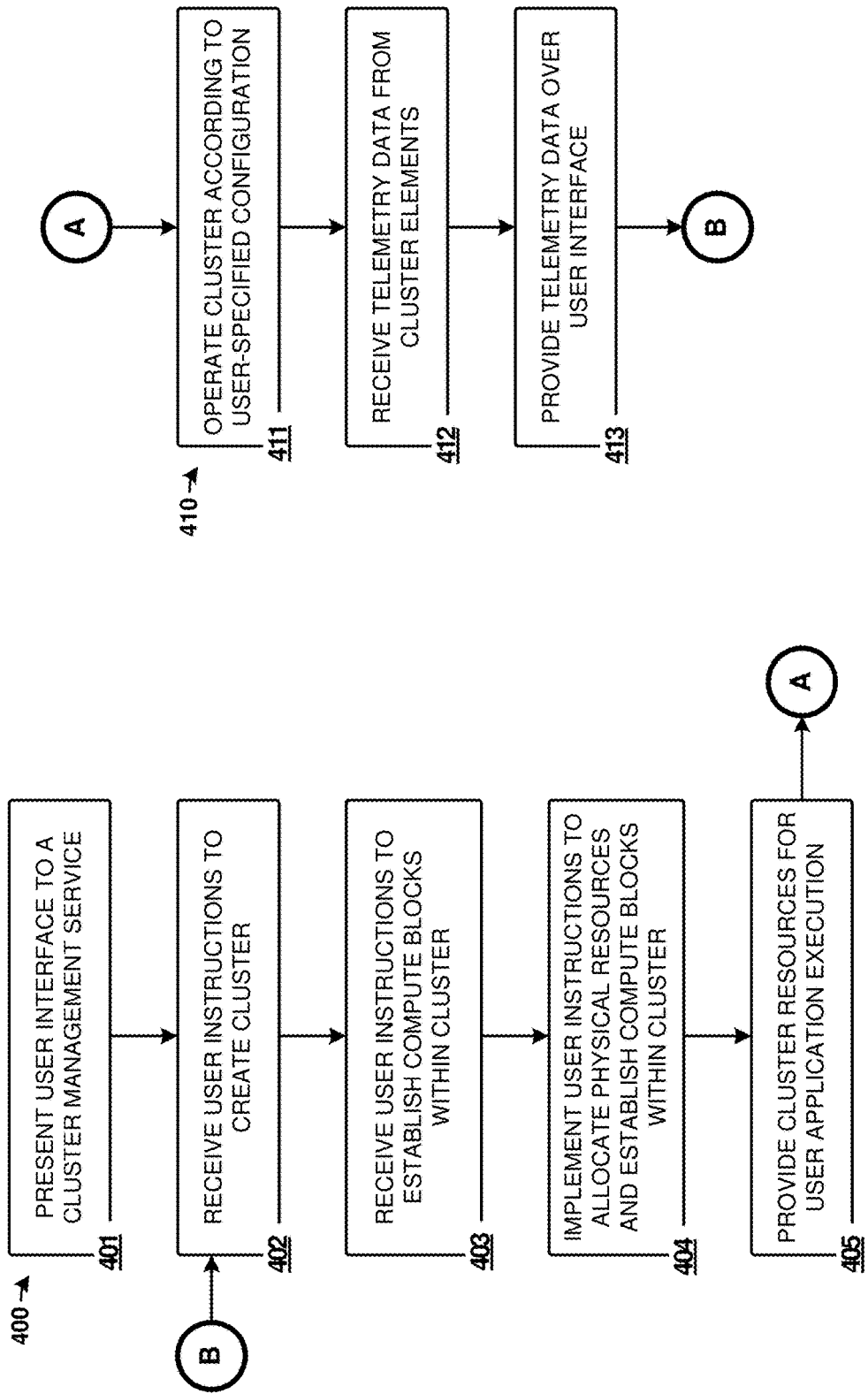
FIG. 4 illustrates operations of a computing platform in an implementation.

FIG. 4 is a flow diagram that illustrates operational examples for any of the systems discussed herein, such as for platform 100 of FIG. 1, system 200 of FIG. 2, or processor 300 of FIG. 3. In FIG. 4, operations will be discussed in context of elements of FIGS. 1 and 2, although the operations can also apply to elements of other Figures herein.

Management processor 110 presents (401) a user interface to a cluster management service. This user interface can comprise a GUI or other user interfaces. The user interface allows users to create clusters (402) and assign resources thereto. The clusters can be represented graphically according to what resources have been assigned, and can have associated names or identifiers specified by the users, or predetermined by the system. The user can then establish compute blocks (403) and assign these compute blocks to clusters. The compute blocks can have resource elements/units such as processing elements, graphics processing elements, storage elements, and network interface elements, among other elements.

Once the user specifies these various clusters and compute blocks within the clusters, then management processor 110 can implement (404) the instructions. The implementation can include allocating resources to particular clusters and compute units within allocation tables or data structures maintained by processor 110. The implementation can also include configuring PCIe switch elements of a PCIe fabric to logically partition the resources into a routing domain for the PCIe fabric. The implementation can also include initializing processors, storage drives, GPUs, memory devices, and network elements to bring these elements into an operational state and associated these elements with a particular cluster or compute unit. Moreover, the initialization can include deploying user software to processors, configuring network interfaces with associated addresses and network parameters, and establishing partitions or logical units (LUNs) among the various storage elements. Once these resources have been assigned to the cluster/compute unit and initialized, then they can be made available to users for executing user operating systems, user applications, and for user storage processes, among other user purposes.

Additionally, as will be discussed below in FIGS. 6-14, multiple GPUs can be allocated to a single host, and these allocations can be dynamically changed/altered. Management processor 110 can control the allocation of GPUs to various hosts, and configures properties and operations of the PCIe fabric to enable this dynamic allocation. Furthermore, peer-to-peer relationships can be established among GPUs so that traffic exchanged between GPUs need not be transferred through an associated host processor, greatly increasing throughputs and processing speeds.

FIG. 4 illustrates continued operation, such as for a user to monitor or modify operation of an existing cluster or compute units. An iterative process can occur where a user can monitor and modify elements and these elements can be re-assigned, aggregated into the cluster, or disaggregated from the cluster.

In operation 411, the cluster is operated according to user specified configurations, such as those discussed in FIG. 4. The operations can include executing user operating systems, user applications, user storage processes, graphics operations, among other user operations. During operation, telemetry is received (412) by processor 110 from the various cluster elements, such as PCIe switch elements, processing elements, storage elements, network interface elements, and other elements, including user software executed by the computing elements. The telemetry data can be provided (413) over the user interface to the users, stored in one or more data structures, and used to prompt further user instructions (operation 402) or to modify operation of the cluster.

The systems and operations discussed herein provide for dynamic assignment of computing resources, graphics processing resources, network resources, or storage resources to a computing cluster. The computing units are disaggregated from any particular cluster or computing unit until allocated by users of the system. Management processors can control the operations of the cluster and provide user interfaces to the cluster management service provided by software executed by the management processors. A cluster includes at least one "machine" or computing unit, while a computing unit include at least a processor element. Computing units can also include network interface elements, graphics processing elements, and storage elements, but these elements are not required for a computing unit.

Processing resources and other elements (graphics processing, network, storage) can be swapped in and out of computing units and associated clusters on-the-fly, and these resources can be assigned to other computing units or clusters. In one example, graphics processing resources can be dispatched/orchestrated by a first computing resource/CPU and subsequently provide graphics processing status/results to another compute unit/CPU. In another example, when resources experience failures, hangs, overloaded conditions, then additional resources can be introduced into the computing units and clusters to supplement the resources.

Processing resources can have unique identifiers assigned thereto for use in identification by the management processor and for identification on the PCIe fabric. User supplied software such as operating systems and applications can be deployed to processing resources as-needed when the processing resources are initialized after adding into a compute unit, and the user supplied software can be removed from a processing resource when that resource is removed from a compute unit. The user software can be deployed from a storage system that the management processor can access for the deployment. Storage resources, such as storage drives, storage devices, and other storage resources, can be allocated and subdivided among compute units/clusters. These storage resources can span different or similar storage drives or devices, and can have any number of logical units (LUNs), logical targets, partitions, or other logical arrangements. These logical arrangements can include one or more LUNs, iSCSI LUNs, NVMe targets, or other logical partitioning. Arrays of the storage resources can be employed, such as mirrored, striped, redundant array of independent disk (RAID) arrays, or other array configurations can be employed across the storage resources. Network resources, such as network interface cards, can be shared among the compute units of a cluster using bridging or spanning techniques. Graphics resources, such as GPUs, can be shared among more than one compute unit of a cluster using NT partitioning or domain-based partitioning over the PCIe fabric and PCIe switches.

Figure 5:
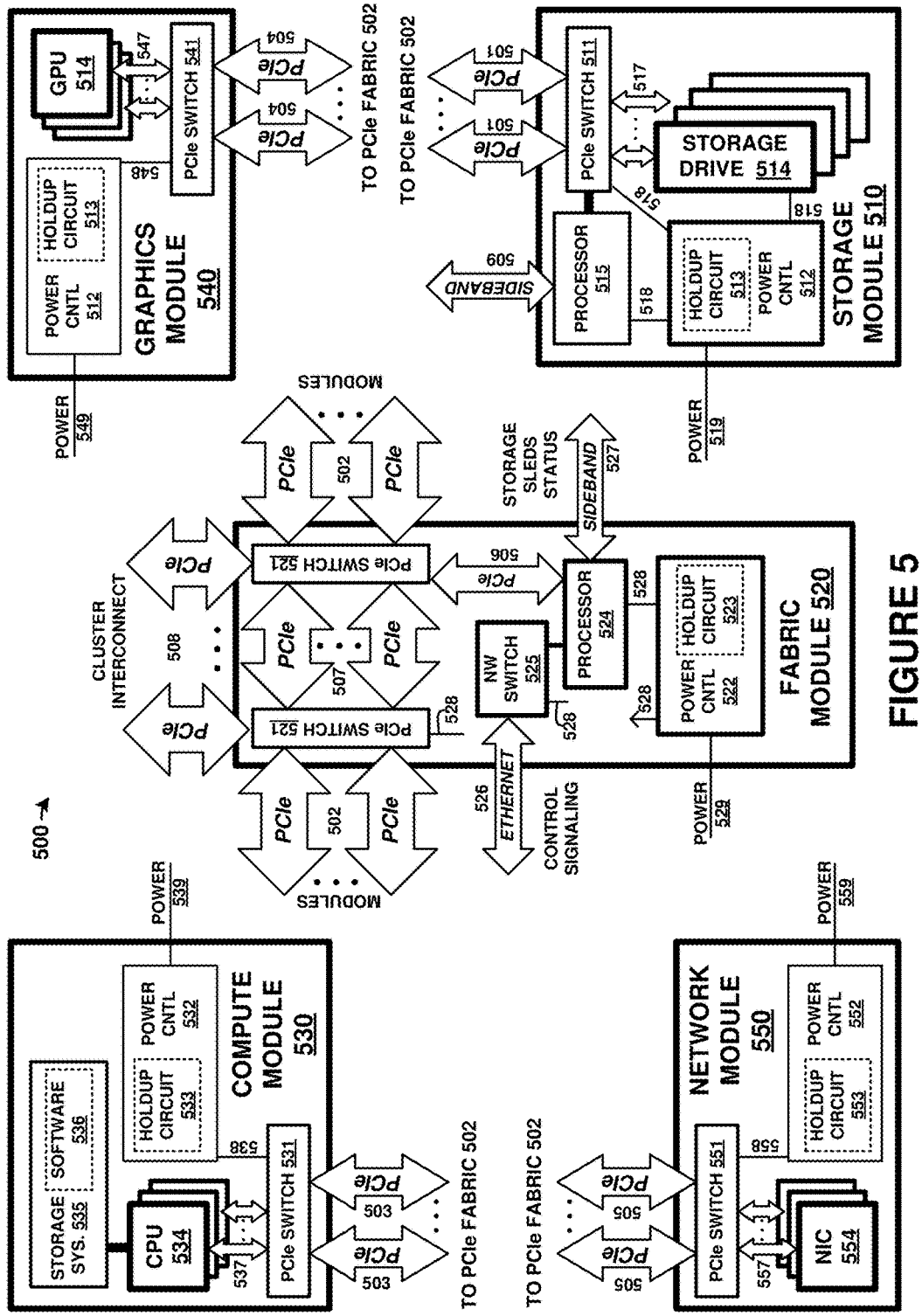
FIG. 5 illustrates components of a computing platform in an implementation.

FIG. 5 is a block diagram illustrating resource elements of computing platform 500, such as computing platform 110. The resource elements are coupled over a PCIe fabric provided by fabric module 520. PCIe fabric links 501-507 each provide PCIe links internal to an enclosure comprising computing platform 500. Cluster PCIe fabric links 508 comprise external PCIe links for interconnecting individual enclosures comprising a cluster.

Multiple instances of resource units 510, 530, 540, and 550 are typically provided, and can be logically coupled over the PCIe fabric established by fabric module 520. More than one fabric module 520 might be included to achieve the PCIe fabric, depending in part on the number of resource units 510, 530, 540, and 550.

The modules of FIG. 5 each include one or more PCIe switches (511, 521, 531, 541, 551), one or more power control modules (512, 522, 532, 542, 552) with associated holdup circuits (513, 523, 533, 543, 553), power links (518, 528, 538, 548, 558), and internal PCIe links (517, 527, 537, 547, 557). It should be understood that variations are possible, and one or more of the components of each module might be omitted.

Fabric module 520 provides at least a portion of a Peripheral Component Interconnect Express (PCIe) fabric comprising PCIe links 501-508. PCIe links 508 provide external interconnect for devices of a computing/storage cluster, such as to interconnect various computing/storage rackmount modules. PCIe links 501-507 provide internal PCIe communication links and to interlink the one or more PCIe switches 521. Fabric module 520 also provides one or more Ethernet network links 526 via network switch 525. Various sideband or auxiliary links 527 can be employed as well in fabric module 520, such as System Management Bus (SMBus) links, Joint Test Action Group (JTAG) links, Inter-Integrated Circuit (I2C) links, Serial Peripheral Interfaces (SPI), controller area network (CAN) interfaces, universal asynchronous receiver/transmitter (UART) interfaces, universal serial bus (USB) interfaces, or any other communication interfaces. Further communication links can be included that are not shown in FIG. 5 for clarity.

Each of links 501-508 can comprise various widths or lanes of PCIe signaling. PCIe can support multiple bus widths, such as ×1, ×4, ×8, ×16, and ×32, with each multiple of bus width comprising an additional "lane" for data transfer. PCIe also supports transfer of sideband signaling, such as SMBus and JTAG, as well as associated clocks, power, and bootstrapping, among other signaling. For example, each of links 501-508 can comprise PCIe links with four lanes "×4" PCIe links, PCIe links with eight lanes "×8" PCIe links, or PCIe links with 16 lanes "×16" PCIe links, among other lane widths.

Power control modules (512, 522, 532, 542, 552) can be included in each module. Power control modules receive source input power over associated input power links (519, 529, 539, 549, 559) and converts/conditions the input power for use by the elements of the associated module. Power control modules distribute power to each element of the associated module over associated power links. Power control modules include circuitry to selectively and individually provide power to any of the elements of the associated module. Power control modules can receive control instructions from an optional control processor over an associated PCIe link or sideband link (not shown in FIG. 5 for clarity). In some examples, operations of power control modules are provided by processing elements discussed for control processor 524. Power control modules can include various power supply electronics, such as power regulators, step up converters, step down converters, buck-boost converters, power factor correction circuits, among other power electronics. Various magnetic, solid state, and other electronic components are typically sized according to the maximum power draw for a particular application, and these components are affixed to an associated circuit board.

Holdup circuits (513, 523, 533, 543, 553) include energy storage devices for storing power received over power links for use during power interruption events, such as loss of input power. Holdup circuits can include capacitance storage devices, such as an array of capacitors, among other energy storage devices. Excess or remaining holdup power can be held for future use, bled off into dummy loads, or redistributed to other devices over PCIe power links or other power links.

Each PCIe switch (511, 521, 531, 541, 551) comprises one or more PCIe crosspoint switches, which logically interconnect various ones of the associated PCIe links based at least on the traffic carried by associated PCIe links. Each PCIe switch establishes switched connections between any PCIe interfaces handled by each PCIe switch. In some examples, ones of the PCIe switches comprise PLX/Broadcom/Avago PEX8796 24-port, 96 lane PCIe switch chips, PEX8725 10-port, 24 lane PCIe switch chips, PEX97xx chips, PEX9797 chips, or other PEX87xx/PEX97xx chips. In some examples, redundancy is established via one or more PCIe switches, such as having primary and secondary/backup ones among the PCIe switches. Failover from primary PCIe switches to secondary/backup PCIe switches can be handled by at least control processor 524. In some examples, primary and secondary functionality can be provided in different PCIe switches using redundant PCIe links to the different PCIe switches. In other examples, primary and secondary functionality can be provided in the same PCIe switch using redundant links to the same PCIe switch.

PCIe switches 521 each include cluster interconnect interfaces 508 which are employed to interconnect further modules of storage systems in further enclosures. Cluster interconnect provides PCIe interconnect between external systems, such as other storage systems, over associated external connectors and external cabling. These connections can be PCIe links provided by any of the included PCIe switches, among other PCIe switches not shown, for interconnecting other modules of storage systems via PCIe links. The PCIe links used for cluster interconnect can terminate at external connectors, such as mini-Serial Attached SCSI (SAS) HD connectors, zSFP+ interconnect, or Quad Small Form Factor Pluggable (QSFFP) or QSFP/QSFP+ jacks, which are employed to carry PCIe signaling over associated cabling, such as mini-SAS or QSFFP cabling. In further examples, MiniSAS HD cables are employed that drive 12 Gb/s versus 6 Gb/s of standard SAS cables. 12 Gb/s can support at least PCIe Generation 3.

PCIe links 501-508 can also carry NVMe (NVM Express) traffic issued by a host processor or host system. NVMe (NVM Express) is an interface standard for mass storage devices, such as hard disk drives and solid state memory devices. NVMe can supplant serial ATA (SATA) interfaces for interfacing with mass storage devices in personal computers and server environments. However, these NVMe interfaces are limited to one-to-one host-drive relationship, similar to SATA devices. In the examples discussed herein, a PCIe interface can be employed to transport NVMe traffic and present a multi-drive system comprising many storage drives as one or more NVMe virtual logical unit numbers (VLUNs) over a PCIe interface.

Each resource unit of FIG. 5 also includes associated resource elements. Storage modules 510 include one or more storage drives 514. Compute modules 530 include one or more central processing units (CPUs) 534, storage systems 535, and software 536. Graphics modules 540 include one or more graphics processing units (GPUs) 544. Network modules 550 include one or more network interface cards (NICs) 554. It should be understood that other elements can be included in each resource unit, including memory devices, auxiliary processing devices, support circuitry, circuit boards, connectors, module enclosures/chassis, and other elements.

Figure 6B:
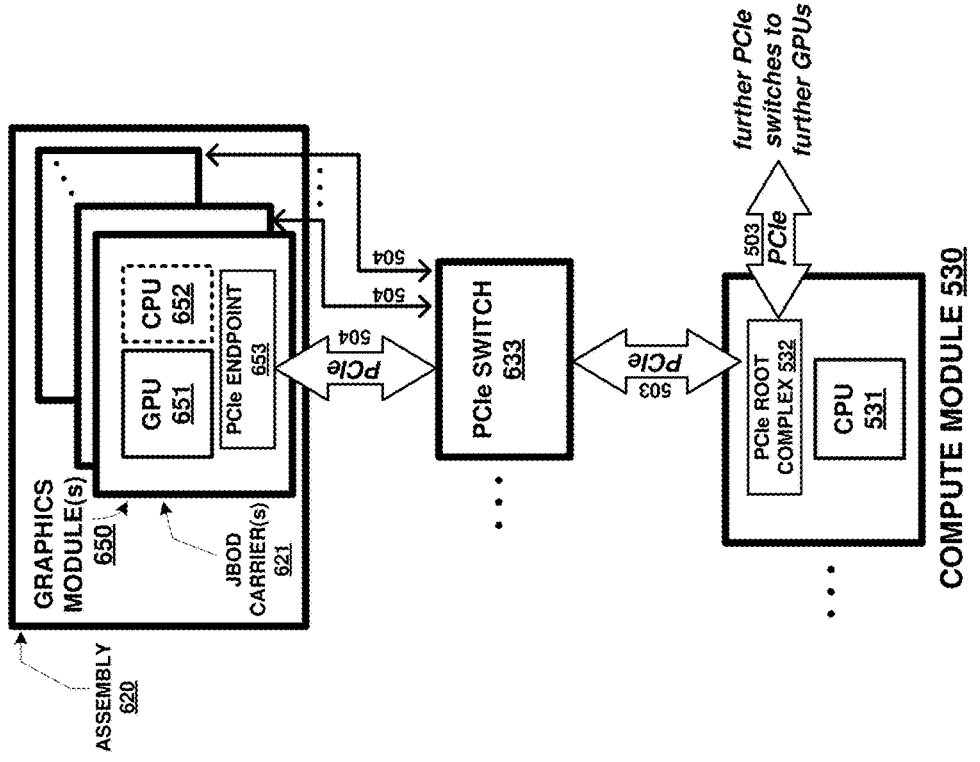
FIG. 6B illustrates components of a computing platform in an implementation.
Figure 6A:
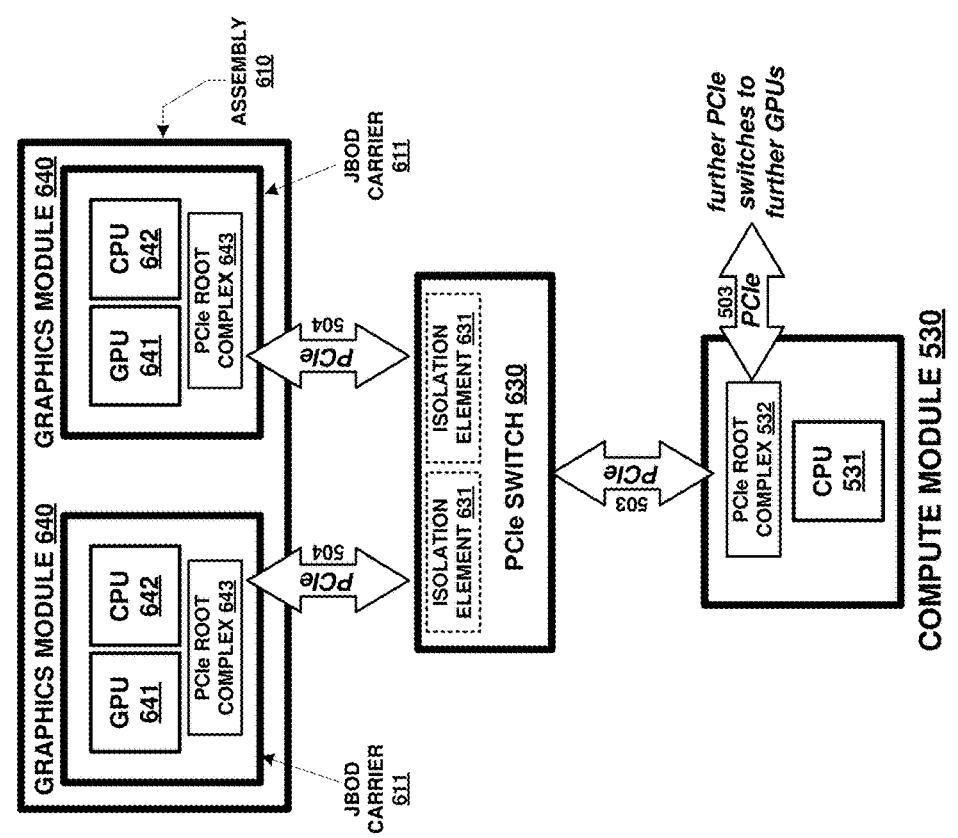
FIG. 6A illustrates components of a computing platform in an implementation.

FIGS. 6A and 6B illustrate example graphics processing configurations. Graphics modules 640 and 650 can comprise two different styles of graphics modules. A first style 640 includes GPU 641 with CPU 642 and PCIe root complex 643, sometimes referred to as a PCIe host. A second style 650 includes GPU 651 that acts as a PCIe endpoint 653, sometimes referred to as a PCIe device. Each of modules 640 and 650 can be included in carriers, such as rackmount assemblies. For example, modules 640 are included in assembly 610, and modules 650 are included in assembly 620. These rackmount assemblies can include JBOD carriers normally used to carry storage drives, hard disk drives, or solid state drives. Example rackmount physical configurations are shown in enclosure 190 of FIG. 1, and FIGS. 8-9 below.

FIG. 6A illustrates a first example graphics processing configuration. A plurality of graphics modules 640 that each include GPU 641, CPU 642, and PCIe root complex 643 can be coupled through PCIe switch 630 to a controller, such as to CPU 531 in compute module 530. PCIe switch 630 can include isolation elements 631, such as non-transparent ports, logical PCIe domains, port isolation, or Tunneled Window Connection (TWC) mechanisms that allow PCIe hosts to communicate over PCIe interfaces. Normally, only one "root complex" is allowed on a PCIe system bus. However, more than one root complex can be included on an enhanced PCIe fabric as discussed herein using some form of PCIe interface isolation among the various devices.

In FIG. 6A, each GPU 641 is accompanied by a CPU 642 with an associated PCIe root complex 643. Each CPU 531 is accompanied by an associated PCIe root complex 532. To advantageously allow these PCIe root complex entities to communicate with a controlling host CPU 531, isolation elements 631 are included in PCIe switch circuitry 630. Thus, compute module 530 as well as each graphics module 640 can include their own root complex structures. Moreover, when employed in a separate enclosure, graphics module 640 can be included on a carrier or modular chassis that can be inserted and removed from the enclosure. Compute module 530 can dynamically add, remove, and control a large number of graphics modules with root complex elements in this manner DMA transfers can be used to transfer data between compute module 530 and each individual graphics module 640. Thus, a cluster of GPUs can be created and controlled by a single compute module or main CPU. This main CPU can orchestrate tasks and graphics/data processing for each of the graphics modules and GPUs. Additional PCIe switch circuits can be added to scale up the quantity of GPUs, while maintaining isolation among the root complexes for DMA transfer of data/control between the main CPU and each individual GPU.

FIG. 6B illustrates a second example graphics processing configuration. A plurality of graphics modules 650 that include at least GPU 651 and PCIe endpoint elements 653 can be coupled through PCIe switch 633 to a controller, such as compute module 530. In FIG. 6B, each GPU 651 is optionally accompanied by a CPU 652, and the graphics modules 650 act as PCIe endpoints or devices without root complexes. Compute modules 530 can each include root complex structures 532. When employed in a separate enclosure, graphics modules 650 can be included on a carrier or modular chassis that can be inserted and removed from the enclosure. Compute module 530 can dynamically add, remove, and control a large number of graphics modules as endpoint devices in this manner. Thus, a cluster of GPUs can be created and controlled by a single compute module or host CPU. This host CPU can orchestrate tasks and graphics/data processing for each of the graphics modules and GPUs. Additional PCIe switch circuits can be added to scale up the quantity of GPUs.

Figure 7:
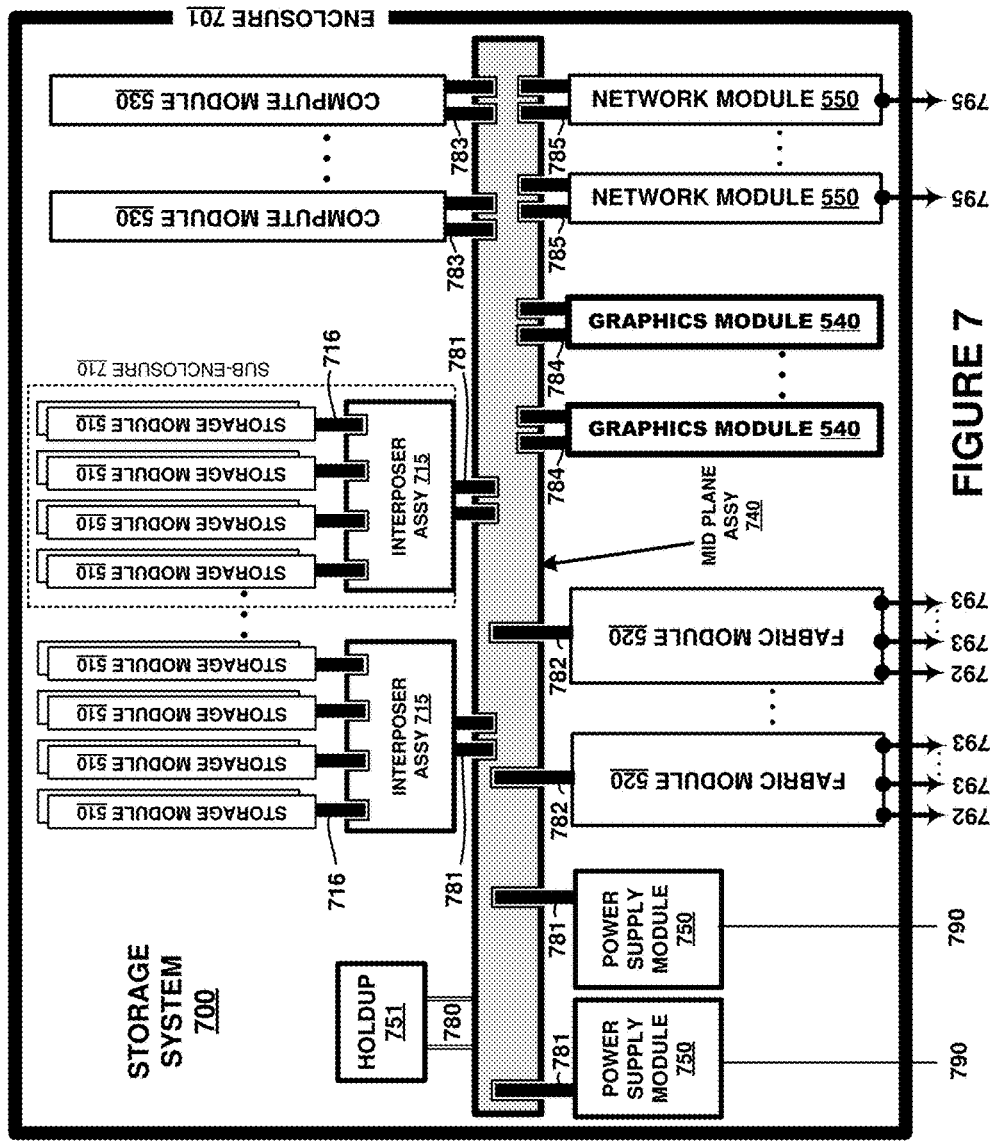
FIG. 7 illustrates components of a computing platform in an implementation.
Figure 8:
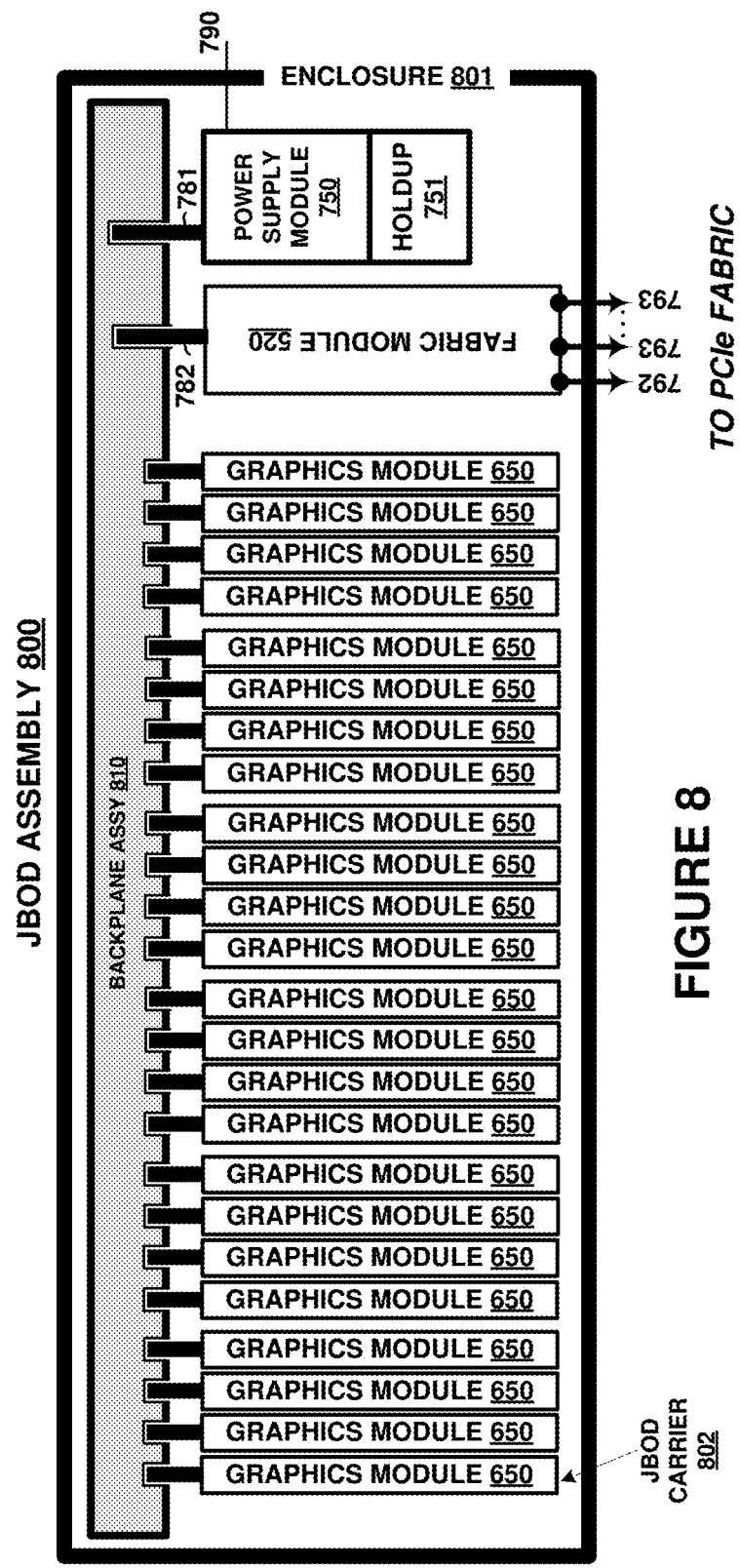
FIG. 8 illustrates components of a computing platform in an implementation.
Figure 9:
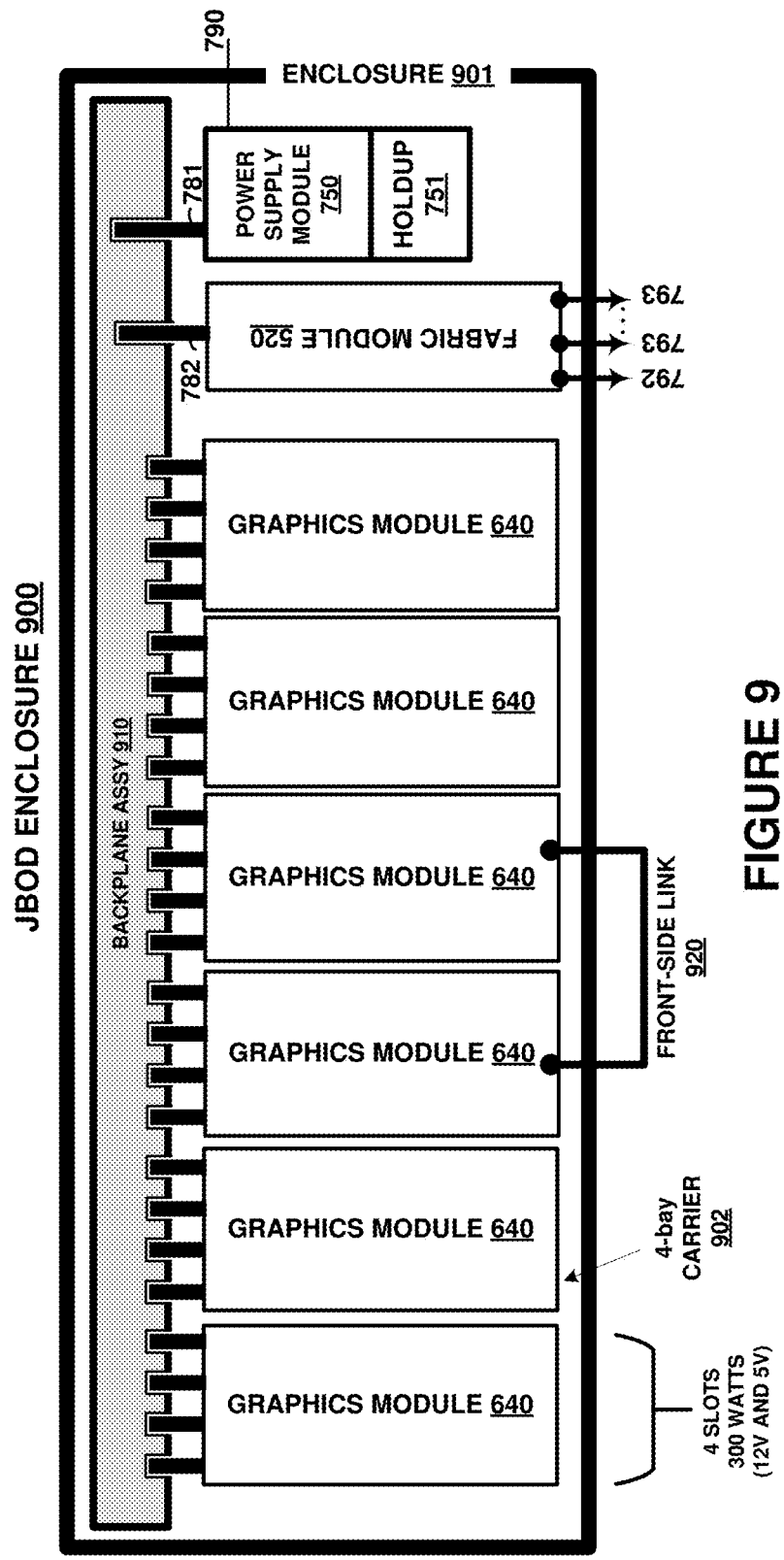
FIG. 9 illustrates components of a computing platform in an implementation.

FIG. 7 is a block diagram illustrating an example physical configuration of storage system 700. FIG. 7 includes graphics modules 540 in a similar enclosure as compute modules and other modules. FIGS. 8 and 9 show graphics modules that might be included in separate enclosures than enclosure 701, such as JBOD enclosures normally configured to hold disk drives. Enclosure 701 and the enclosures in FIGS. 8 and 9 can be communicatively coupled over one or more external PCIe links, such as through links provided by fabric module 520.

FIG. 7 is a block diagram illustrating the various modules of the previous figures as related to a midplane. The elements of FIG. 7 are shown as physically mated to a midplane assembly. Midplane assembly 740 includes circuit board elements and a plurality of physical connectors for mating with any associated interposer assemblies 715, storage sub-enclosures 710, fabric modules 520, compute modules 530, graphics modules 540, network modules 550, or power supply modules 750. Midplane 740 comprises one or more printed circuit boards, connectors, physical support members, chassis elements, structural elements, and associated links as metallic traces or optical links for interconnecting the various elements of FIG. 7. Midplane 740 can function as a backplane, but instead of having sleds or modules mate on only one side as in single-ended backplane examples, midplane 740 has sleds or modules that mate on at least two sides, namely a front and rear. Elements of FIG. 7 can correspond to similar elements of the Figures herein, such as computing platform 100, although variations are possible.

FIG. 7 shows many elements included in a 1U enclosure 701. The enclosure can instead be of any multiple of a standardized computer rack height, such as 1U, 2U, 3U, 4U, 5U, 6U, 7U, and the like, and can include associated chassis, physical supports, cooling systems, mounting features, cases, and other enclosure elements. Typically, each sled or module will fit into associated slot or groove features included in a chassis portion of enclosure 701 to slide into a predetermined slot and guide a connector or connectors associated with each module to mate with an associated connector or connectors on midplane 740. System 700 enables hot-swapping of any of the modules or sleds and can include other features such as power lights, activity indicators, external administration interfaces, and the like.

Storage modules 510 each have an associated connector 716 which mates into a mating connector of an associated interposer assembly 715. Each interposer assembly 715 has associated connectors 781 which mate with one or more connectors on midplane 740. In this example, up to eight storage modules 510 can be inserted into a single interposer assembly 715 which subsequently mates to a plurality of connectors on midplane 740. These connectors can be a common or shared style/type which is used by compute modules 530 and connector 783. Additionally, each collection of storage modules 510 and interposer assembly 715 can be included in a sub-assembly or sub-enclosure 710 which is insertable into midplane 740 in a modular fashion. Compute modules 530 each have an associated connector 783, which can be a similar type of connector as interposer assembly 715. In some examples, such as in the examples above, compute modules 530 each plug into more than one mating connector on midplane 740.

Fabric modules 520 couple to midplane 740 via connector 782 and provide cluster-wide access to the storage and processing components of system 700 over cluster interconnect links 793. Fabric modules 520 provide control plane access between controller modules of other 1U systems over control plane links 792. In operation, fabric modules 520 each are communicatively coupled over a PCIe mesh via link 782 and midplane 740 with compute modules 530, graphics modules 540, and storage modules 510, such as pictured in FIG. 7.

Graphics modules 540 comprises one or more graphics processing units (GPUs) along with any associated support circuitry, memory elements, and general processing elements. Graphics modules 540 couple to midplane 740 via connector 784.

Network modules 550 comprise one or more network interface card (NIC) elements, which can further include transceivers, transformers, isolation circuitry, buffers, and the like. Network modules 550 might comprise Gigabit Ethernet interface circuitry that can carry Ethernet traffic, along with any associated Internet protocol (IP) and transmission control protocol (TCP) traffic, among other network communication formats and protocols. Network modules 550 couple to midplane 740 via connector 785.

Cluster interconnect links 793 can comprise PCIe links or other links and connectors. The PCIe links used for external interconnect can terminate at external connectors, such as mini-SAS or mini-SAS HD jacks or connectors which are employed to carry PCIe signaling over mini-SAS cabling. In further examples, mini-SAS HD cables are employed that drive 12 Gb/s versus 6 Gb/s of standard SAS cables. 12 Gb/s can support PCIe Gen 3. Quad (4-channel) Small Form-factor Pluggable (QSFP or QSFP+) connectors or jacks can be employed as well for carrying PCIe signaling.

Control plane links 792 can comprise Ethernet links for carrying control plane communications. Associated Ethernet jacks can support 10 Gigabit Ethernet (10 GbE), among other throughputs. Further external interfaces can include PCIe connections, FiberChannel connections, administrative console connections, sideband interfaces such as USB, RS-232, video interfaces such as video graphics array (VGA), high-density media interface (HDMI), digital video interface (DVI), among others, such as keyboard/mouse connections.

External links 795 can comprise network links which can comprise Ethernet, TCP/IP, Infiniband, iSCSI, or other external interfaces. External links 795 can comprise links for communicating with external systems, such as host systems, management systems, end user devices, Internet systems, packet networks, servers, or other computing systems, including other enclosures similar to system 700. External links 795 can comprise Quad Small Form Factor Pluggable (QSFFP) or Quad (4-channel) Small Form-factor Pluggable (QSFP or QSFP+) jacks, or zSFP+ interconnect, carrying at least 40 GbE signaling.

In some examples, system 700 includes case or enclosure elements, chassis, and midplane assemblies that can accommodate a flexible configuration and arrangement of modules and associated circuit cards. Although FIG. 7 illustrates storage modules mating and controller modules on a first side of midplane assembly 740 and various modules mating on a second side of midplane assembly 740, it should be understood that other configurations are possible. System 700 can include a chassis to accommodate any of the following configurations, either in front-loaded or rear-loaded configurations: storage modules that contain multiple SSDs each; modules containing HHHL cards (half-height half-length PCIe cards) or FHHL cards (full-height half-length PCIe cards), that can comprise graphics cards or graphics processing units (GPUs), PCIe storage cards, PCIe network adaptors, or host bus adaptors; modules with PCIe cards (full-height full-length PCIe cards) that comprise controller modules, which can comprise nVIDIA Tesla, nVIDIA Jetson, or Intel Phi processor cards, among other processing or graphics processors; modules containing 2.5-inch PCIe SSDs; or cross-connect modules, interposer modules, and control elements.

Additionally, power and associated power control signaling for the various modules of system 700 is provided by one or more power supply modules 750 over associated links 781, which can comprise one or more links of different voltage levels, such as +12 VDC or +5 VDC, among others. Although power supply modules 750 are shown as included in system 700 in FIG. 7, it should be understood that power supply modules 750 can instead be included in separate enclosures, such as separate 1U enclosures. Each power supply node 750 also includes power link 790 for receiving power from power sources, such as AC or DC input power.

Additionally, power holdup circuitry can be included in holdup modules 751 which can deliver holdup power over links 780 responsive to power loss in link 790 or from a failure of power supply modules 750. Power holdup circuitry can also be included on each sled or module. This power holdup circuitry can be used to provide interim power to the associated sled or module during power interruptions, such as when main input or system power is lost from a power source. Additionally, during use of holdup power, processing portions of each sled or module can be employed to selectively power down portions of each module according to usage statistics, among other considerations. This holdup circuitry can provide enough power to commit in-flight write data during power interruptions or power loss events. These power interruption and power loss events can include loss of power from a power source, or can include removal of a sled or module from an associated socket or connector on midplane 740. The holdup circuitry can include capacitor arrays, super-capacitors, ultra-capacitors, batteries, fuel cells, or other energy storage components, along with any associated power control, conversion, regulation, and monitoring circuitry.

FIG. 8 is a block diagram illustrating an example physical configuration of a graphics module carrier enclosure. In this example, JBOD assembly 800 is employed, with a plurality of slots or bays provided by enclosure 801, which comprises a chassis and other structure/encasing components. Bays in JBOD assembly 800 normally are configured to hold storage drives or disk drives, such as HDDs, SSDs, or other drives, which can still be inserted into the bays or slots of enclosure 801. A mixture of disk drive modules, graphics modules, and network modules (550) might be included. JBOD assembly 800 can receive input power over power link 790. Optional power supply 751, fabric modules 520, and holdup circuitry 751 are shown in FIG. 8.

JBOD carriers 802 can be employed to hold graphics modules 650 or storage drives into individual bays of JBOD assembly 800. In FIG. 8, each graphics module takes up only one slot or bay. FIG. 8 shows 24 graphics modules 650 included in individual slots/bays. Graphics modules 650 can each comprise a carrier or sled that carries GPU, CPU, and PCIe circuitry assembled into a removable module. Graphics modules 650 can also include carrier circuit boards and connectors to ensure each GPU, CPU, and PCIe interface circuitry can physically, electrically, and logically mate into the associated bays. In some examples, graphics modules 650 in FIG. 8 each comprise nVIDIA Jetson modules that are fitted into a carrier configured to be inserted into a single bay of JBOD enclosure 800. Backplane assembly 810 is included that comprises connectors, interconnect, and PCIe switch circuitry to couple the slots/bays over external control plane links 792 and external PCIe links 793 to a PCIe fabric provided by another enclosure, such as enclosure 701.

JBOD carriers 802 connect to backplane assembly 810 via one or more associated connectors for each carrier. Backplane assembly 810 can include associated mating connectors. These connectors on each of JBOD carriers 802 might comprise U.2 drive connectors, also known as SFF-8639 connectors, which can carry PCIe or NVMe signaling. Backplane assembly 810 can then route this signaling to fabric module 520 or associated PCIe switch circuitry of JBOD assembly 800 for communicatively coupling modules to a PCIe fabric. Thus, when populated with one or more graphics processing modules, such as graphics modules 650 in FIG. 7, the graphics processing modules are inserted into bays normally reserved for storage drives that couple over U.2 drive connectors. These U.2 drive connectors can carry per-bay ×4 PCIe interfaces.

In another example bay configuration, FIG. 9 is presented. FIG. 9 is a block diagram illustrating another example physical configuration of a graphics module carrier enclosure. In this example, JBOD assembly 900 is employed, with a plurality of slots or bays provided by enclosure 901, which comprises a chassis and other structure/encasing components. Bays in JBOD assembly 900 normally are configured to hold storage drives or disk drives, such as HDDs, SSDs, or other drives, which can still be inserted into the bays or slots of enclosure 901. A mixture of disk drive modules, graphics modules, and network modules (550) might be included. JBOD assembly 900 can receive input power over power link 790. Optional power supply 751, fabric modules 520, and holdup circuitry 751 are shown in FIG. 9.

JBOD carriers 902 can be employed to hold graphics modules 640 or storage drives into individual bays of JBOD assembly 900. In FIG. 9, each graphics module takes up four (4) slots or bays. FIG. 9 shows 6 graphics modules 640 included in associated spanned slots/bays. Graphics modules 640 can each comprise a carrier or sled that carries GPU, CPU, and PCIe circuitry assembled into a removable module. Graphics modules 640 can also include carrier circuit boards and connectors to ensure each GPU, CPU, and PCIe interface circuitry can physically, electrically, and logically mate into the associated bays. In some examples, graphics module 640 comprises nVIDIA Tesla modules that are fitted into a carrier configured to be inserted into four-bay span of JBOD enclosure 900. Backplane assembly 910 is included that comprises connectors, interconnect, and PCIe switch circuitry to couple the slots/bays over external control plane links 792 and external PCIe links 793 to a PCIe fabric provided by another enclosure, such as enclosure 701.

JBOD carriers 902 connect to backplane assembly 910 via more than one associated connectors for each carrier. Backplane assembly 910 can include associated mating connectors. These individual connectors on each of JBOD carriers 902 might comprise individual U.2 drive connectors, also known as SFF-8639 connectors, which can carry PCIe or NVMe signaling. Backplane assembly 910 can then route this signaling to fabric module 520 or associated PCIe switch circuitry of JBOD assembly 900 for communicatively coupling modules to a PCIe fabric. When populated with one or more graphics processing modules, such as graphics modules 640, the graphics processing modules are each inserted to span more than one bay, which includes connecting to more than one bay connector and more than one bay PCIe interface. These individual bays are normally reserved for storage drives that couple over individual bay U.2 drive connectors and per-bay ×4 PCIe interfaces. A combination of graphics modules 640 that span more than one bay, and graphics modules 650 that use only one bay might be employed in some examples.

FIG. 9 is similar to that of FIG. 8 except a larger bay footprint is used by graphics modules 640, to advantageously accommodate larger graphics module power or PCIe interface requirements. In FIG. 8, the power supplied to a single bay/slot is sufficient to power an associated graphics module 650. However, in FIG. 9, larger power requirements of graphics modules 640 preclude use of a single slot/bay, and instead four (4) bays are spanned by a single module/carrier to provide the approximately 300 watts required for each graphics processing module 640. Power can be drawn from both 12 volt and 5 volt supplies to establish the 300 watt power for each "spanned" bay. A single modular sled or carrier can physically span multiple slot/bay connectors to allow the power and signaling for those bays to be employed. Moreover, PCIe signaling can be spanned over multiple bays, and a wider PCIe interface can be employed for each graphics module 640. In one example, each graphics module 650 has a ×4 PCIe interface, while each graphics module 640 has a ×16 PCIe interface. Other PCIe lane widths are possible. A different number of bays than four might be spanned in other examples.

In FIGS. 8 and 9, PCIe signaling, as well as other signaling and power, are connected on a 'back' side via backplane assemblies, such as assemblies 810 and 910. This 'back' side comprises an inner portion of each carrier that is inserted into a corresponding bay or bays. However, further communicative coupling can be provided for each graphics processing module on a 'front' side of the modules. Graphics modules can be coupled via front-side point-to-point or mesh communication links 920 that span more than one graphics module. In some examples, NVLink interfaces, InfiniBand, point-to-point PCIe links, or other high-speed serial near-range interfaces are applied to couple two or more graphics modules together for further communication among graphics modules.

Figure 10:
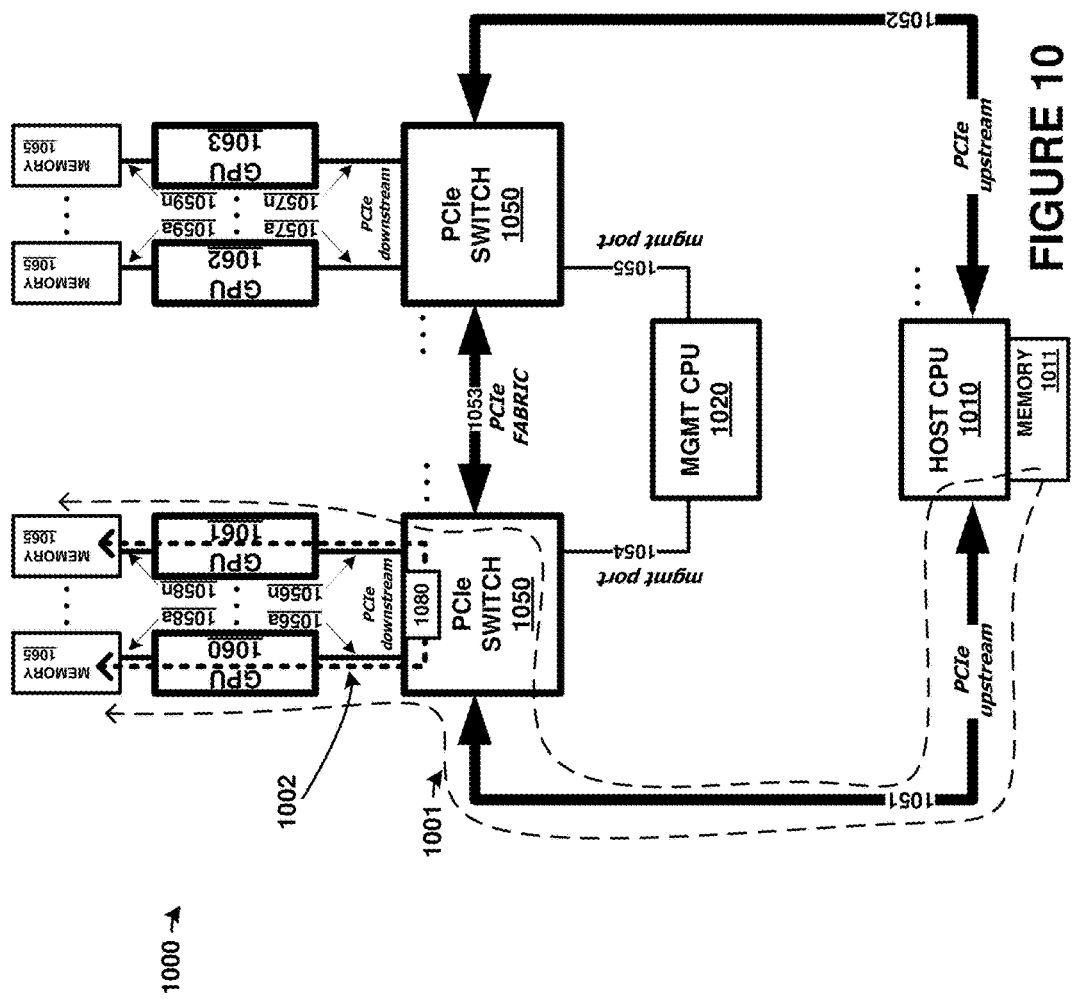
FIG. 10 illustrates components of a computing platform in an implementation.

FIG. 10 illustrates components of computing platform 1000 in an implementation. Computing platform 1000 includes several elements communicatively coupled over a PCIe fabric formed from various PCIe links 1051-1053 and one or more PCIe switch circuits 1050. Host processors or central processing units (CPUs) can be coupled to this PCI fabric for communication with various elements, such as those discussed in the preceding Figures. However, in FIG. 10 host CPU 1010 and GPUs 1060-1063 will be discussed. GPUs 1060-1063 each comprise graphics processing circuitry, PCIe interface circuitry, and are coupled to associated memory devices 1065 over corresponding links 1058a-1058n and 1059a-1059n.

In FIG. 10, management processor (CPU) 1020 can establish a peer-to-peer arrangement between GPUs over the PCIe fabric by at least providing an isolation function 1080 in the PCIe fabric configured to isolate a device PCIe address domain associated with the GPUs from a local PCIe address domain associated with host CPU 1010 that initiates the peer-to-peer arrangement between the GPUs. Specifically, host CPU 1010 might want to initiate a peer-to-peer arrangement, such as a peer-to-peer communication link, among two or more GPUs in platform 1000. This peer-to-peer arrangement enables the GPUs to communicate more directly with each other to bypass transferring communications through host CPU 1010.

Without a peer-to-peer arrangement, for example, traffic between GPUs is typically routed through a host processor.

This can be seen in FIG. 10 as communication link 1001 which shows communications between GPU 1060 and GPU 1061 being routed over PCIe links 1051 and 1056, PCIe switch 1050, and host CPU 1010. Latency can be higher for this arrangement, as well as other bandwidth reductions by handling the traffic through many links, switch circuitry, and processing elements. Advantageously, isolation function 1080 can be established in the PCIe fabric which allows for GPU 1060 to communicate more directly with GPU 1061, bypassing links 1051 and host CPU 1010. Less latency is encountered as well as higher bandwidth communications. This peer-to-peer arrangement is shown in FIG. 10 as peer-to-peer communication link 1002.

Management CPU 1020 can comprise control circuitry, processing circuitry, and other processing elements. Management CPU 1020 can comprise elements of management processor 110 in FIGS. 1-2 or management processor 300 of FIG. 3. In some examples, management CPU 1020 can be coupled to a PCIe fabric or to management/control ports on various PCIe switch circuitry, or incorporate the PCIe switch circuitry or control portions thereof. In FIG. 10, management CPU 1020 establishes the isolation function and facilitates establishment of peer-to-peer link 1002. A further discussion of the elements of a peer-to-peer arrangement as well as operational examples of management CPU 1020 and associated circuity is seen in FIGS. 11-14. Management CPU 1020 can communicate with PCIe switches 1050 over management links 1054-1055. These management links comprise PCIe links, such as ×1 or ×4 PCIe links, and may comprise I2C links, network links, or other communication links.

Figure 11:
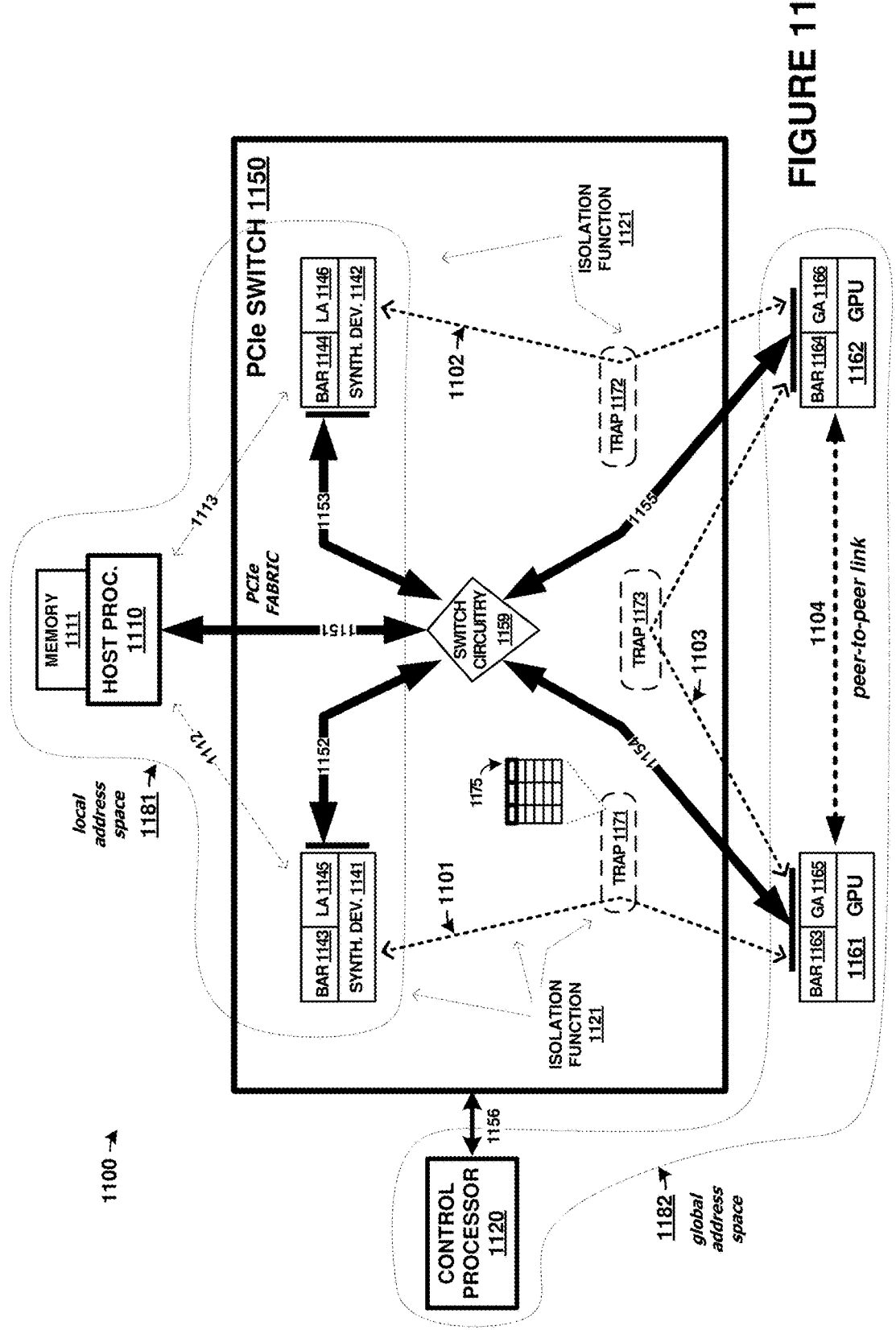
FIG. 11 illustrates components of a computing platform in an implementation.

FIG. 11 illustrates components of computing platform 1100 in an implementation. Platform 1100 shows a more detailed implementation example for elements of FIG. 10, although variations are possible. Platform 1100 includes host processor 1110, memory 1111, control processor 1120, PCIe switch 1150, and GPUs 1161-1162. Host processor 1110 and GPUs 1161-1162 are communicatively coupled by switch circuitry 1159 in PCIe switch 1150, which forms a portion of a PCIe fabric along with PCIe links 1151-1155. Control processor 1120 also communicates with PCIe switch 1150 over a PCIe link, namely link 1156, but this link typically comprises a control port, administration link, management link, or other link functionally dedicated to control of the operation of PCIe switch 1150. However, other examples have control processor 1120 coupled via the PCIe fabric.

In FIG. 11, two or more PCIe addressing domains are established. These address domains (1181, 1182) are established as a part of an isolation function to logically isolate PCIe traffic of host processor 1110 from GPUs 1161-1162. Furthermore, synthetic PCIe devices are created by control processor 1120 to further comprise the isolation function between PCIe address domains. This isolation function provides for isolation of host processor 1110 from GPUs 1161-1162 as well as provides for enhanced peer-to-peer arrangements among GPUs.

To achieve this isolation function, various elements of FIG. 11 are employed, such as those indicated above. Isolation function 1121 comprises address traps 1171-1173 and synthetic devices 1141. These address traps comprise an address monitoring portion an address translation portion. The address monitoring portion monitors PCIe destination addresses in PCIe frames or other PCIe traffic to determine if one or more affected addresses are encountered. If these addresses are encountered, then the address traps translate the original PCIe destination addresses into modified PCIe destination addresses, and transfers the PCIe traffic for delivery over the PCIe fabric to hosts or devices that correspond to the modified PCIe destination addresses. Address traps 1171-1173 can include one or more address translation tables or other data structures, such as example table 1175, that map translations between incoming destination addresses and outbound destination addresses that are used to modify PCIe addresses accordingly. Table 1175 contains entries that translate addressing among the synthetic devices in the local address space and the physical/actual devices in the global/device address space.

Synthetic devices 1141-1142 comprise logical PCIe devices that represent corresponding ones of GPUs 1161-1162. Synthetic device 1141 represents GPU 1161, and synthetic device 1142 represents GPU 1162. As will be discussed in further detail below, when host processor 1110 issues PCIe traffic for delivery to GPUs 1161-1162, this traffic is actually addressed for delivery to synthetic devices 1141-1142. Specifically, device drivers of host processor 1110 uses destination addressing that corresponds to associated synthetic devices 1141-1142 for any PCIe traffic issued by host processor 1110 for GPUs 1161-1162. This traffic is transferred over the PCIe fabric and switch circuitry 1159. Address traps 1171-1172 intercept this traffic that includes the addressing of synthetic devices 1141-1142, and reroutes this traffic for delivery to addressing associated with GPUs 1161-1162. Likewise, PCIe traffic issued by GPUs 1161-1162 is addressed by the GPUs for delivery to host processor 1110. In this manner, each of GPU 1141 and GPU 1142 can operate with regard to host processor 1110 using PCIe addressing that corresponds to synthetic devices 1141 and synthetic devices 1142.

Host processor 1110 and synthetic devices 1141-1142 are included in a first PCIe address domain, namely a 'local' address space 1181 of host processor 1110. control processor 1120 and GPUs 1161-1162 are included in a second PCIe address domain, namely a 'global' address space 1182. The naming of the address spaces is merely exemplary, and other naming schemes can be employed. Global address space 1182 can be used by control processor 1120 to provision and deprovision devices, such as GPUs, for use by various host processors. Thus, any number of GPUs can be communicatively coupled to a host processor, and these GPUs can be dynamically added and removed for use by any given host processor.

It should be noted that synthetic devices 1141-1142 each have corresponding base address registers (BAR 1143-1144) and corresponding device addresses 1145-1146 in the local addressing (LA) domain. Furthermore, GPUs 1161-1162 each have corresponding base address registers (BAR 1163-1164) and corresponding device addresses 1165-1166 in the global addressing (GA) domain. The LA and GA addresses correspond to addressing that would be employed to reach the associated synthetic or actual device.

Figure 12:
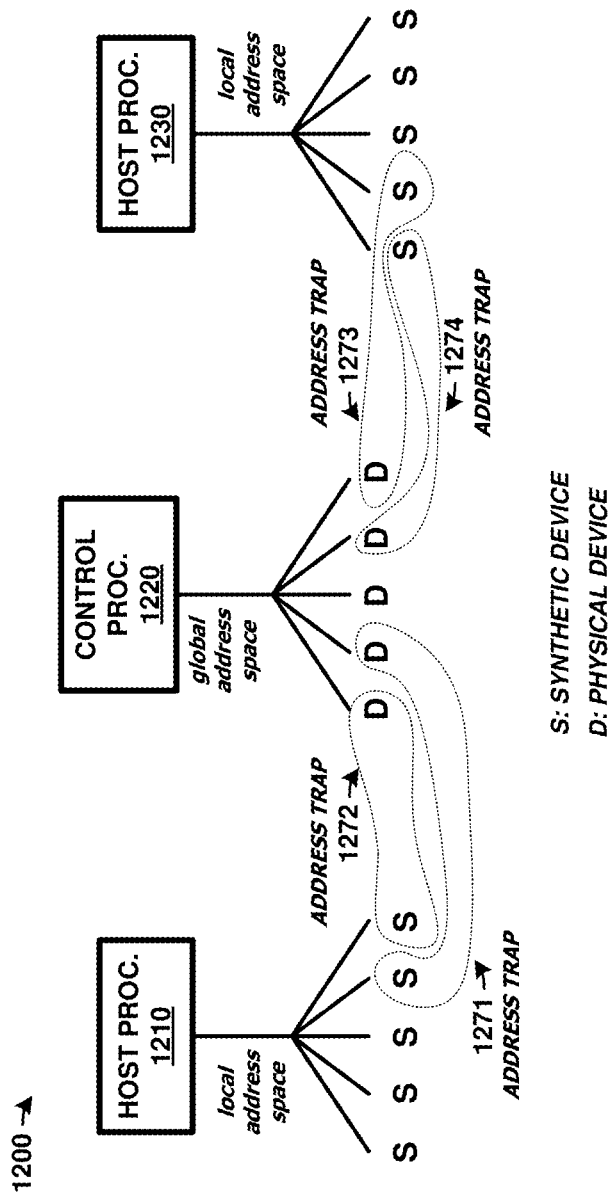
FIG. 12 illustrates components of a computing platform in an implementation.

To further illustrate the operation of the various addressing domains, FIG. 12 is presented. FIG. 12 illustrates components of computing platform 1200 in an implementation. Platform 1200 includes host processor 1210, control processor 1220, and host processor 1230. Each host processor is communicatively coupled to a PCIe fabric, such as any of those discussed herein. Furthermore, control processor 1220 can be coupled to the PCIe fabric or to management ports on various PCIe switch circuitry, or incorporate the PCIe switch circuitry or control portions thereof.

FIG. 12 is a schematic representation of PCIe addressing and associated domains formed among PCIe address spaces. Each host processor has a corresponding 'local' PCIe address space, such as that corresponding to an associated root complex. Each individual PCIe address space can comprise a full domain of the 64-bit address space of the PCIe specification, or a portion thereof. Furthermore, an additional PCIe address space/domain is associated with control processor 1220, referred to herein as a 'global' or 'device' PCIe address space.

The isolation functions with associated address traps form links between synthetic devices and actual devices. The synthetic devices represent the actual devices in another PCIe space than that of the devices themselves. In FIG. 12, the various devices, such as GPUs or any other PCIe devices, are configured to reside within the global address space that is controlled by control processor 1220. In FIG. 12, the actual devices are represented by 'D' symbols. The various synthetic devices, represented by 'S' symbols in FIG. 12, are configured to reside on associated local address spaces for corresponding host processors.

In FIG. 12, four address traps are shown, namely address traps 1271-1274. Address traps are formed to couple various synthetic devices to various physical/actual devices. These address traps, such as those discussed in FIG. 11, are configured to intercept PCIe traffic directed to the synthetic devices and forward to the corresponding physical devices. Likewise, the address traps are configured to intercept PCIe traffic directed to the physical devices and forward to the corresponding synthetic devices. Address translation is performed to alter the PCIe address of PCIe traffic that corresponds to the various address traps.

Advantageously, any host processor with a corresponding local PCIe address space can be dynamically configured to communicate with any PCIe device that resides in the global PCIe address space, and vice versa. Devices can be added and removed during operation of the host processors, which can support scaling up or down available resources for each added/removed device. When GPUs are employed as the devices, then GPU resources can be added or removed on-the-fly to any host processor. Hot-plugging of PCIe devices are enhanced, and devices that are installed into rack-mounted assemblies comprises dozens of GPUs can be intelligently assigned and re-assigned to host processors as needed. Synthetic devices can be created/destroyed as needed, or a pool of synthetic devices might be provisioned for a particular host, and the synthetic devices can be configured with appropriate addressing to allow corresponding address trap functions to route traffic to desired GPUs/devices. Control processor 1220 handles the setup of synthetic devices, address traps, synthetic devices, and the provisioning/deprovisioning of devices/GPUs.

Figure 13:
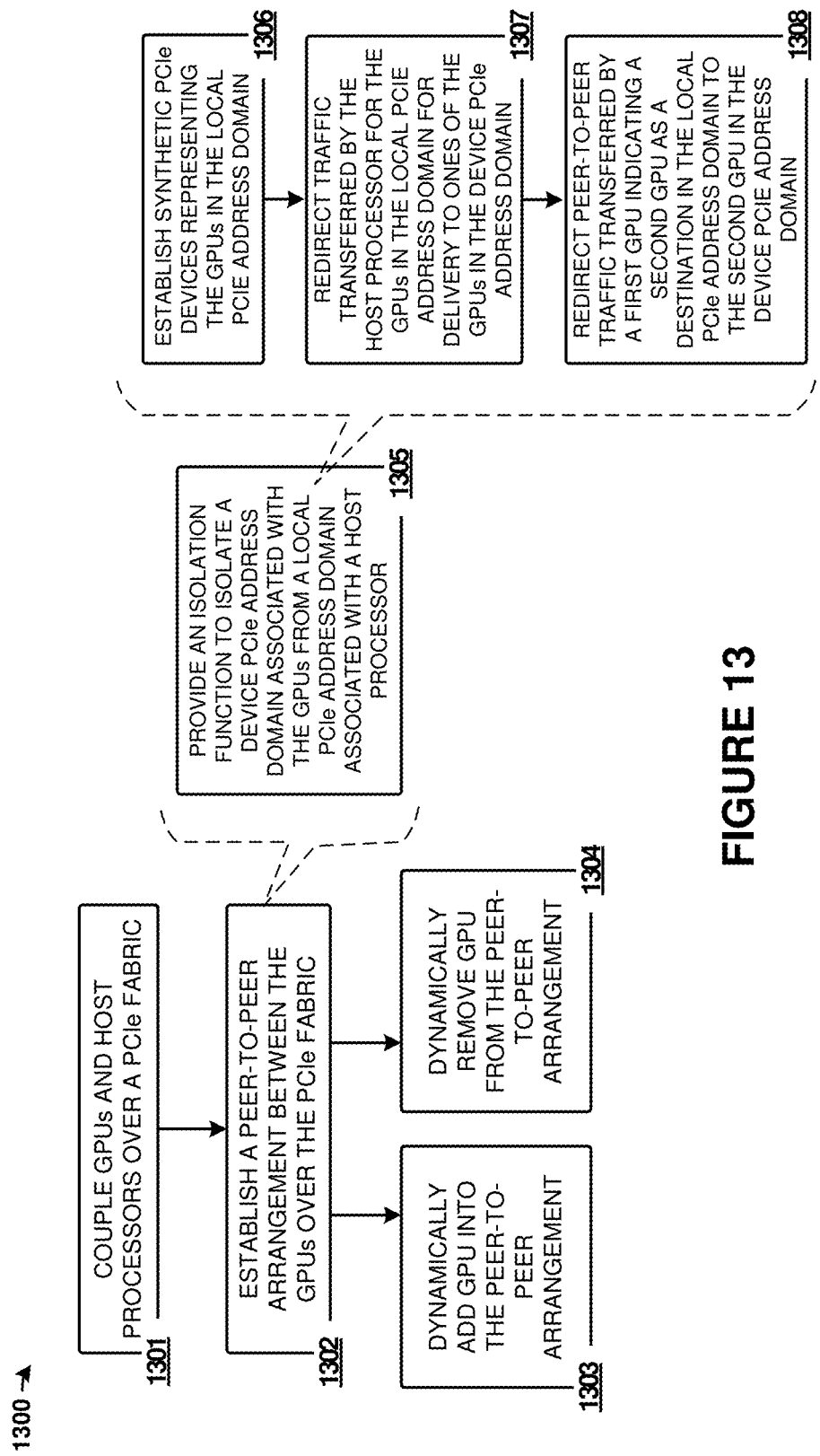
FIG. 13 illustrates operations of a computing platform in an implementation.

Turing now to example operations of the elements of FIGS. 10-12, FIG. 13 is presented. FIG. 13 is a flow diagram illustrating example operations of a computing platform, such as computing platform 1000, 1100, or 1200. The operations of FIG. 13 are discussed in the context of elements of FIG. 11. However, it should be understood that elements of any of the Figures herein can be employed. FIG. 13 also discusses operation of a peer-to-peer arrangement among GPUs or other PCIe devices, such as seen with peer-to-peer link 1002 in FIG. 10 or peer-to-peer link 1104 in FIG. 11. Peer-to-peer linking allows for more direct transfer of data or other information between PCIe devices, such as GPUs for enhanced processing, increased data bandwidth, and lower latency.

In FIG. 13, a PCIe fabric is provided (1301) to couple GPUs and one or more host processors. In FIG. 11, this PCIe fabric can be formed among PCI switch 1150 and PCIe links 1151-1155, among further PCIe switches coupled by PCIe links. However, the GPUs and host processors as this point are merely coupled electrically to the PCIe fabric, and are not yet configured to communicate. A host processor, such as host processor 1110 might wish to communicate with one or more GPU devices, and furthermore allow those GPU devices to communicate over a peer-to-peer arrangement to enhance the processing performance of the GPUs. Control processor 1120 can establish (1302) a peer-to-peer arrangement between the GPUs over the PCIe fabric. Once established, control processor 1120 can dynamically add (1303) GPUs into the peer-to-peer arrangement, and dynamically remove (1304) GPUs from the peer-to-peer arrangement.

To establish the peer-to-peer arrangement, control processor 1120 provides (1305) an isolation function to isolate a device PCIe address domain associated with the GPUs from a local PCIe address domain associated with a host processor. In FIG. 11, host processor 1110 includes or is coupled with a PCIe root complex which is associated with local PCIe address space 1181. Control processor 1120 can provide the root complex for a 'global' or device PCIe address space 1182, or another element not shown in FIG. 11 might provide this root complex. A plurality of GPUs are included in the address space 1182, and global addresses 1165-1166 are employed as the device/endpoint addresses for the associated GPUs. The two distinct PCIe address spaces are logically isolated from one another, and PCIe traffic or communications are not transferred across the PCIe address spaces.

To interwork PCIe traffic or communications among the PCIe address spaces, control processor 1120 establishes (1306) synthetic PCIe devices representing the GPUs in the local PCIe address domain. The synthetic PCIe devices are formed in logic provided by PCIe switch 1150 or control processor 1120, and each provide for a PCIe endpoint that represents the associated GPU in the local address space of the particular host processor. Furthermore, address traps are provided for each synthetic device that intercepts PCIe traffic destined for the corresponding synthetic device and re-routes the PCIe traffic for delivery to appropriate physical/actual GPUs. Thus, control processor 1120 establishes address traps 1171-1172 that redirect (1307) traffic transferred by host processor 1110 for GPUs 1161-1162 in the local PCIe address domain for delivery to ones of the GPUs in the device PCIe address domain. In a first example, PCIe traffic issued by host processor 1110 can be addressed for delivery to synthetic device 1141, namely local address (LA) 1145. Synthetic device 1141 has been established as an endpoint for this traffic, and address trap 1171 is established to redirect this traffic for delivery to GPU 1161 at global address (GA) 1165. In a second example, PCIe traffic issued by host processor 1110 can be addressed for delivery to synthetic device 1142, namely LA 1146. Synthetic device 1142 has been established as an endpoint for this traffic, and address trap 1172 is established to redirect this traffic for delivery to GPU 1162 at GA 1166.

Handling of PCIe traffic issued by the GPUs can work in a similar manner. In a first example, GPU 1161 issues traffic for delivery to host processor 1110, and this traffic might identify an address in the local address space of host processor 1110, and not a global address space address. Trap 1171 identifies this traffic as destined for host processor 1110 and redirects the traffic for delivery to host processor 1110 in the address domain/space associated with host processor 1110. In a second example, GPU 1162 issues traffic for delivery to host processor 1110, and this traffic might identify an address in the local address space of host processor 1110, and not a global address space address. Trap 1172 identifies this traffic as destined for host processor 1110 and redirects the traffic for delivery to host processor 1110 in the address domain/space associated with host processor 1110.

In addition to host-to-device traffic discussed above, isolation function 1121 can provide for peer-to-peer arrangements among GPUs. Control processor 1120 establishes address trap 1173 that redirects (1308) peer-to-peer traffic transferred by a first GPU indicating a second GPU as a destination in the local PCIe address domain to the second GPU in the global/device PCIe address domain. Each GPU need not be aware of the different PCIe address spaces, such as in the host-device example above where the GPU uses an associated address in the local address space of the host processor for traffic issued to the host processor. Likewise, each GPU when engaging in peer-to-peer communications can issue PCIe traffic for delivery to another GPU using addressing native to the local address space of host processor 1110 instead of the addressing native to the global/device address space. However, since each GPU is configured to respond to addressing in the global address space, then address trap 1173 is configured to redirect traffic accordingly. GPUs use addressing of the local address space of host processor 1110 due to host processor 1110 typically communicating with the GPUs to initialize the peer-to-peer arrangement among the GPUs. Although the peer-to-peer arrangement is facilitated by control processor 1120 managing the PCIe fabric and isolation function 1121, the host processor and GPUs are not typically aware of the isolation function and different PCIe address spaces. Instead, the host processor communicates with synthetic devices 1141-1142 as if those synthetic devices were the actual GPUs. Likewise, GPUs 1161-1162 communicate with the host processor and each other without knowledge of the synthetic devices or the address trap functions. Thus, traffic issued by GPU 1161 for GPU 1162 uses addressing in the local address space of the host processor to which those GPUs are assigned. Address trap 1173 detects the traffic with the addressing in the local address space and redirects the traffic using addressing in the global address space.

In a specific example of peer-to-peer communications, the host processor will initially set up the arrangement between GPUs, and indicate peer-to-peer control instructions identifying addressing to the GPUs that is within the local PCIe address space of the host processor. Thus, the GPUs are under the control of the host processor, even though the host processor communicates with synthetic devices established within the PCIe fabric or PCIe switching circuitry. When GPU 1161 has traffic for delivery to GPU 1162, GPU 1161 will address the traffic as destined for GPU 1162 in the local address space (i.e. LA 1146 associated with synthetic device 1142), and address trap 1173 will redirect this traffic to GA 1166. This redirection can include translating addressing among PCIe address spaces, such as by replacing or modifying addressing of the PCIe traffic to include the redirection destination address instead of the original destination address. When GPU 1162 has traffic for delivery to GPU 1161, GPU 1162 will address the traffic as destined for GPU 1161 in the local address space (i.e. LA 1145 associated with synthetic device 1141), and address trap 1173 will redirect this traffic to GA 1165. This redirection can include replacing or modifying addressing of the PCIe traffic to include the redirection destination address instead of the original destination address. Peer-to-peer link 1104 is thus logically created which allows for more direct flow of communications among GPUs.

Figure 14:
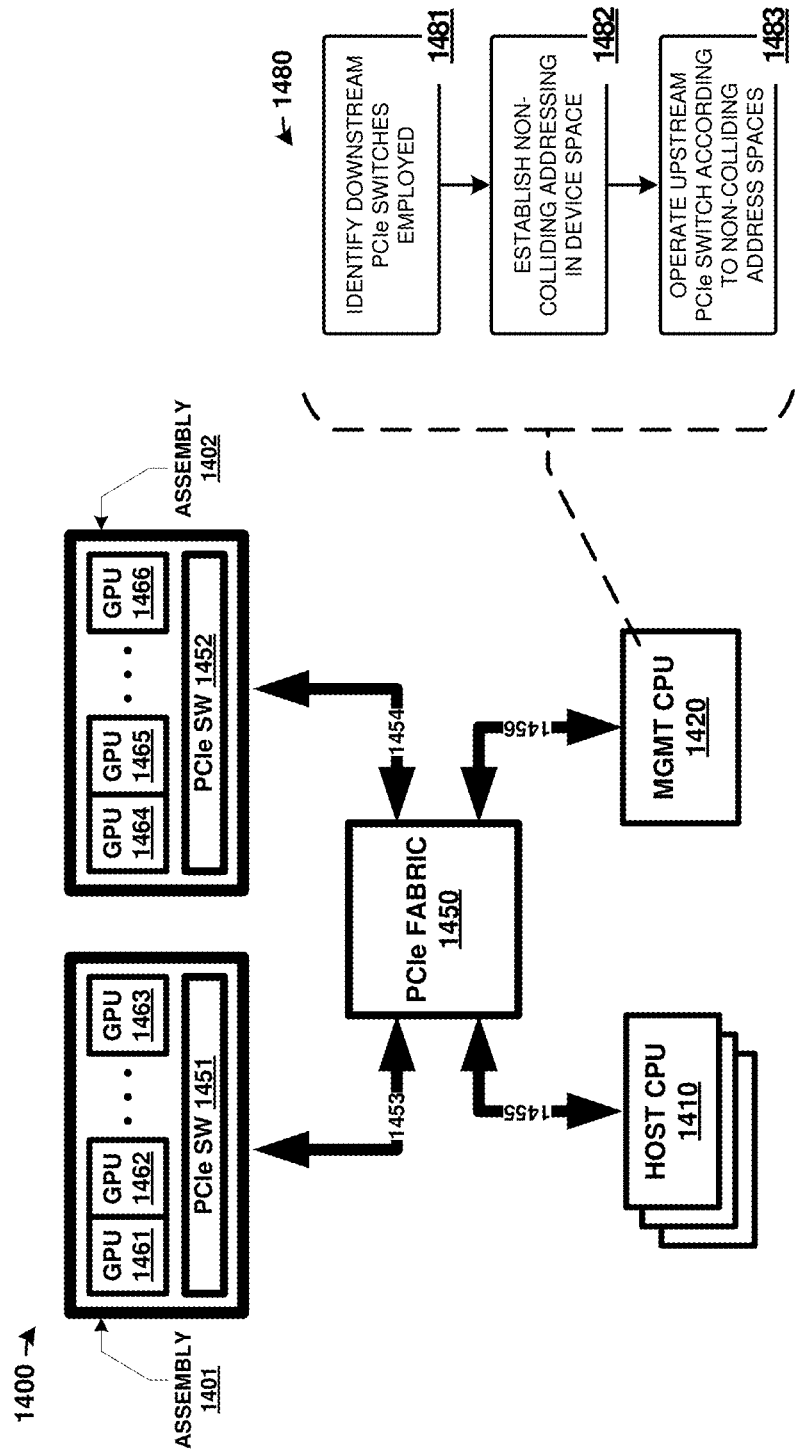
FIG. 14 illustrates components of a computing platform in an implementation.

FIG. 14 is presented to illustrate further details on address space isolation and selection of appropriate addressing when communicatively coupling host processors to PCIe devices, such as GPUs. In FIG. 14, computing platform 1400 is presented. Computing platform 1400 includes several host CPUs 1410, a management CPU 1420, PCIe fabric 1450, as well as one or more assemblies 1401-1402 that house a plurality associated of GPUs 1462-1466 as well as a corresponding PCIe switch 1451. Assemblies 1401-1402 might comprise any of the chassis, rackmount or JBOD assemblies herein, such as found in FIGS. 1 and 7-9. A number of PCIe links interconnect the elements of FIG. 14, namely PCIe links 1453-1456. Typically, PCIe link 1456 comprises a special control/management link that enables administrative or management-level access of control to PCIe fabric 1450. However, it should be understood that similar links to the other PCIe links can instead be employed.

According to the examples in FIGS. 10-13, isolation functions can be established to allow for dynamic provisioning/de-provisioning of PCIe devices, such as GPUs, from one or more host processors/CPUs. These isolation functions can provide for separate PCIe address spaces or domains, such as independent local PCIe address spaces for each host processor deployed and a global or device PCIe address space shared by all actual GPUs. However, when certain further downstream PCIe switching circuitry is employed, overlaps in addressing used within the local address spaces of the host processors and the global address spacing of the GPUs can lead to collisions or errors in the handling of the PCIe traffic by PCIe switching circuitry.

Thus, FIG. 14 illustrates enhanced operation for selection of PCIe address allocation and address space configuration. Operations 1480 illustrate example operations for management CPU 1420 used in configuring isolation functions and address domains/spaces. Management CPU 1420 identifies (1481) when downstream PCIe switches are employed, such as when external assemblies are coupled over PCIe links to a PCIe fabric that couples host processors to further computing or storage elements. In FIG. 14, these downstream PCIe switches are indicated by PCIe switches 1451-1452. Management CPU 1420 can identify when these downstream switches are employed using various discovery protocols over the PCIe fabric, over sideband signaling, such as I2C or Ethernet signaling, or using other processes. In some examples, downstream PCIe switches comprise a more primitive or less capable model/type of PCIe switches than those employed upstream, and management CPU 1420 can either detect these configurations via model numbers or be programmed by an operator to compensate for this reduced functionality. The reduced functionality can include not being able to handle multiple PCIe addressing domains/ spaces as effectively as other types of PCIe switches, which can lead to PCIe traffic collisions. Thus, an enhanced operation is provided in operations 1482-1483.

In operation 1482, management CPU 1420 establishes non-colliding addressing for each of the physical/actual PCIe devices in the device/global address spaces with regard to the local PCIe address spaces of the host processors. The non-colliding addressing typically comprise unique, non-overlapping addressing employed for downstream/endpoint PCIe devices. This is done to prevent collisions among PCIe addressing when the synthetic PCIe devices are employed herein. When address translation is performed by various address trap elements to redirect PCIe traffic from a local address space of a host processor to the global address space of the PCIe devices, collisions are prevented by intelligent selection of addressing for the PCIe devices in the global address space. Global address space addresses for devices are selected to be non-overlapping, uncommon, or unique so that more than one host processor does not use similar device addresses in an associated local address space. These addresses are indicated to the host processors during boot, initialization, enumeration, or instantiation of the associated PCIe devices and synthetic counterparts, so that any associated host drivers employ unique addressing across the entire PCIe fabric, even though each host processor might have a logically separate/independent local address space. Once the addressing has been selected and indicated to the appropriate host processors, computing platform 1400 can operate (1483) upstream PCIe switch circuitry and host processors according to the non-colliding address spaces. Advantageously, many host processors are unlikely to have collisions in PCIe traffic with other host processors.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a data processing system, the method comprising:
    communicatively coupling graphics processing units (GPUs) over a Peripheral Component Interconnect Express (PCIe) fabric; and
    establishing a peer-to-peer arrangement between the GPUs over the PCIe fabric by at least providing an isolation function in the PCIe fabric configured to isolate a device PCIe address domain associated with the GPUs from at least a local PCIe address domain associated with a host processor that initiates the peer-to-peer arrangement between the GPUs;
    wherein the isolation function comprises isolating the device PCIe address domain from the local PCIe address domain by at least establishing synthetic PCIe devices representing the GPUs in the local PCIe address domain.

2. The method of claim 1, further comprising:
    redirecting traffic transferred by the host processor for the GPUs in the local PCIe address domain for delivery to corresponding ones of the GPUs in the device PCIe address domain.

3. The method of claim 1, further comprising:
    dynamically adding a selected GPU into the peer-to-peer arrangement by at least instantiating the selected GPU into the device PCIe address domain and providing a further synthetic device representing the selected GPU on the local PCIe address domain.

4. The method of claim 3, further comprising:
    dynamically removing the selected GPU from the peer-to-peer arrangement by at least inactivating further synthetic device.

5. The method of claim 1, further comprising:
    establishing the isolation function in the PCIe fabric by at least providing address traps that monitor for traffic over the PCIe fabric directed to PCIe addresses associated with the GPUs in the local PCIe address domain and translate the PCIe addresses into corresponding PCIe addresses for the GPUs in the device PCIe address domain.

6. The method of claim 1, further comprising:
    responsive to peer-to-peer traffic from a first of the GPUs indicating the second of the GPUs as a destination in the local PCIe address domain, employing a peer-to-peer address trap in the isolation function to receive the peer-to-peer traffic and transfer the peer-to-peer traffic to the second of the GPUs in the device PCIe address domain.

7. The method of claim 6, wherein the peer-to-peer arrangement between the GPUs comprises a direct memory access (DMA) link established between memory associated with each of the GPUs.

8. The method of claim 1, further comprising:
    in a control processor, establishing the isolation function in PCIe switch circuitry that communicatively couples the GPUs and the host processor over the PCIe fabric.

9. The method of claim 1, wherein the isolation function comprises one or more address traps and one or more address translation tables.

10. The method of claim 1, further comprising:
    selecting PCIe addresses in the isolation function for the GPUs in the device PCIe address domain that do not overlap with PCIe address usages of further GPUs communicatively coupled on the PCIe fabric.

11. A data processing system, comprising:
    a Peripheral Component Interconnect Express (PCIe) fabric configured to communicatively couple graphics processing units (GPUs) with at least a host processor; and
    a control processor configured to facilitate a peer-to-peer arrangement between the GPUs over the PCIe fabric by at least establishing an isolation function in the PCIe fabric configured to isolate a device PCIe address domain associated with the GPUs from at least a local PCIe address domain associated with the host processor that initiates the peer-to-peer arrangement between the GPUs by at least establishing synthetic PCIe devices representing the GPUs in the local PCIe address domain.

12. The data processing system of claim 11, comprising:
    the isolation function configured to redirect traffic transferred by the host processor for the GPUs in the local PCIe address domain for delivery to corresponding ones of the GPUs in the device PCIe address domain.

13. The data processing system of claim 11, comprising:
    the control processor configured to dynamically add a selected GPU into the peer-to-peer arrangement by at least instantiating the selected GPU into the device PCIe address domain and providing a further synthetic device representing the selected GPU on the local PCIe address domain; and
    the control processor configured to dynamically remove the selected GPU from the peer-to-peer arrangement by at least inactivating further synthetic device.

14. The data processing system of claim 11, comprising:
    the control processor configured to establish the isolation function in the PCIe fabric by at least providing address traps that monitor for traffic over the PCIe fabric directed to PCIe addresses associated with the GPUs in the local PCIe address domain and translate the PCIe addresses into corresponding PCIe addresses for the GPUs in the device PCIe address domain.

15. The data processing system of claim 11, comprising:
responsive to peer-to-peer traffic from a first of the GPUs indicating the second of the GPUs as a destination in the local PCIe address domain, the isolation function configured to employ a peer-to-peer address trap to receive the peer-to-peer traffic and transfer the peer-to-peer traffic to the second of the GPUs in the device PCIe address domain.

16. The data processing system of claim 15, wherein the peer-to-peer arrangement between the GPUs comprises a direct memory access (DMA) link established between memory associated with each of the GPUs.

17. The data processing system of claim 11, comprising:
the control processor configured to establish the isolation function in PCIe switch circuitry that communicatively couples the GPUs and the host processor over the PCIe fabric, wherein the isolation function comprises one or more address traps and one or more address translation tables.

18. The data processing system of claim 11, comprising:
the control processor configured to select PCIe addresses in the isolation function for the GPUs in the device PCIe address domain that do not overlap with PCIe address usages of further GPUs communicatively coupled on the PCIe fabric.

19. A data processing apparatus comprising:
one or more computer readable storage media;
a processing system operatively coupled with the one or more computer readable storage media; and
program instructions stored on the one or more computer readable storage media, that when executed by the processing system, direct the processing system to at least:

establish a peer-to-peer arrangement between graphics processing units (GPUs) over a Peripheral Component Interconnect Express (PCIe) fabric by at least providing an isolation function in the PCIe fabric configured to isolate a device PCIe address domain associated with the GPUs from at least a local PCIe address domain associated with a host processor that initiates the peer-to-peer arrangement between the GPUs;

wherein the isolation function comprises synthetic PCIe devices representing the GPUs in the local PCIe address domain;

wherein the isolation function is configured to redirect traffic transferred by the host processor for the GPUs in the local PCIe address domain for delivery to corresponding ones of the GPUs in the device PCIe address domain; and wherein the isolation function is further configured to redirect peer-to-peer traffic transferred by a first of the GPUs indicating the second of the GPUs as a destination in the local PCIe address domain to the second of the GPUs in the device PCIe address domain.

20. The apparatus of claim 19, comprising further program instructions, that when executed by the processing system, direct the processing system to at least:

select PCIe addresses in the isolation function for the GPUs in the device PCIe address domain that do not overlap with PCIe address usages of further GPUs communicatively coupled on the PCIe fabric.

* * * * *